US011162699B1

(12) United States Patent
Jones et al.

(10) Patent No.: US 11,162,699 B1
(45) Date of Patent: Nov. 2, 2021

(54) GENERATING SCREENS FOR DISPLAY BY HVAC CONTROLLER USING TEMPLATES

(71) Applicant: Ademco Inc., Golden Valley, MN (US)

(72) Inventors: Christopher R. Jones, Minneapolis, MN (US); Christopher Heintzelman, Plymouth, MN (US); David Johnson, Inver Grove Heights, MN (US); Brian Kearns, Massapequa, NY (US); Cameron Kip Vreeland, Mound, MN (US); David Schultz, Savage, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/993,036

(22) Filed: Aug. 13, 2020

(51) Int. Cl.
| *F24F 11/30* | (2018.01) |
| *G06F 3/14* | (2006.01) |
| *G06F 3/0362* | (2013.01) |
| *G06F 3/0485* | (2013.01) |
| *G06F 3/0488* | (2013.01) |
| *G06F 3/0482* | (2013.01) |
| *G06F 3/0484* | (2013.01) |
| *G05B 19/042* | (2006.01) |
| *F24F 11/52* | (2018.01) |
| *F24F 11/54* | (2018.01) |
| *F24F 11/64* | (2018.01) |
| *F24F 11/65* | (2018.01) |
| *G06F 3/041* | (2006.01) |
| *H04L 29/08* | (2006.01) |

(52) U.S. Cl.
CPC ............. *F24F 11/30* (2018.01); *F24F 11/52* (2018.01); *F24F 11/54* (2018.01); *F24F 11/64* (2018.01); *F24F 11/65* (2018.01); *G05B 19/042* (2013.01); *G06F 3/0362* (2013.01); *G06F 3/041* (2013.01); *G06F 3/0482* (2013.01); *G06F 3/0485* (2013.01); *G06F 3/0488* (2013.01); *G06F 3/04847* (2013.01); *G06F 3/14* (2013.01); *G05B 2219/2614* (2013.01); *H04L 67/10* (2013.01)

(58) Field of Classification Search
CPC .. F24F 11/30; F24F 11/64; F24F 11/65; F24F 11/52; F24F 11/54; G06F 3/0362; G06F 3/041; G06F 3/0482; G06F 3/04847; G06F 3/0485; G06F 3/0488; G06F 3/14; G05B 19/042
See application file for complete search history.

(56) References Cited

U.S. PATENT DOCUMENTS 8,739,070 B2   5/2014   Mullen
8,760,474 B2   6/2014   Jain et al.
(Continued)

*Primary Examiner* — Seth A Silverman
(74) *Attorney, Agent, or Firm* — Shumaker & Sieffert, P.A.

(57) ABSTRACT

In some examples, a system controls a set of heating, ventilation, and air conditioning (HVAC) components in order to regulate one or more parameters of a building. The system includes an HVAC controller device including a dial and a touch screen display. Additionally, the system includes an external server configured to communicate with the HVAC controller via a communication link. The external server is configured to receive data which indicates a set of information from one or more devices. Additionally, the external server is configured to generate, based on the set of information and a set of screen templates stored in a memory of the external server, a screen for display by the touch screen display without updating firmware of the HVAC controller device, and output, to the HVAC controller device, the screen for display by the touch screen display.

20 Claims, 7 Drawing Sheets

(56) References Cited

U.S. PATENT DOCUMENTS

| | | | |
|---|---|---|---|
| 9,223,323 | B2 | 12/2015 | Matas et al. |
| 2012/0229521 | A1 | 9/2012 | Hales, IV et al. |
| 2017/0262153 | A1 | 9/2017 | Hoglund et al. | ns
GENERATING SCREENS FOR DISPLAY BY HVAC CONTROLLER USING TEMPLATES

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors. To simplify the explanation, an environmental control system will be referred to as an HVAC system, unless otherwise noted.

SUMMARY

In general, this disclosure describes a heating, ventilation, and air conditioning (HVAC) controller configured to regulate one or more parameters of a building. The HVAC controller includes a touch screen display which can show any one of a set of screens. For example, the HVAC controller may show one or more carousel screens of a set of carousel screens. The set of carousel screens may represent a sequence of carousel screens, such that when the HVAC controller transitions from displaying a first carousel screen to a second carousel screen on the digital display, the HVAC controller transitions from the first carousel screen to a carousel screen which is adjacent to the first carousel screen in the sequence of carousel screens. Each carousel screen of the set of carousel screens may include information corresponding to one or more parameters of the area inside the building, one or more parameters of the area outside of the building, a status of one or more devices integrated with the HVAC controller, or any combination thereof.

Each carousel screen of the set of carousel screens may be associated with one or more details screens. Each details screen that is associated with a carousel screen, in turn, may include additional information corresponding to the respective carousel screen which is not included in the carousel screen itself. In this way, the screens displayed by the HVAC controller may represent a hierarchy of screens, such that it is possible to scroll horizontally through the set of carousel screens and also move vertically between the carousel screens and corresponding details screens. It may be beneficial for the HVAC controller to change the screen displayed by the digital display both vertically and laterally so that information displayed by the HVAC controller is more easily navigable as compared with HVAC controllers which do not allow a change in display both laterally and vertically.

An external server may receive one or more sets of information and generate the set of carousel screens based on the one or more sets of information. In some examples, the one or more sets of information may include information generated by devices integrated with the HVAC controller, devices not integrated with the HVAC controller, publicly accessible information databases, private information databases, or any combination thereof. Additionally, the external server may store a set of carousel screen templates. To generate a carousel screen, the external server may select a carousel screen template and populate the template with at least a portion of a set of information. The external server may select the carousel screen template based on the set of information which the external server populates the template with. For example, the external server may determine one or more types of the set of information and/or identify one or more sources of the set of information in order to select an appropriate carousel screen template. The external server may, in some cases, generate a carousel screen corresponding to each set of information of the one or more sets of information received by the external server and output the carousel screens to the HVAC controller for display by the touch screen display. The external server may additionally generate a details screen corresponding to a carousel screen by populating a details screen template of a set of details screen templates.

The techniques of this disclosure may provide one or more advantages. For example, it may be beneficial for the external server to generate carousel screens by populating carousel screen templates so that the external server may update the sequence of carousel screens displayed by the HVAC controller without updating a firmware of HVAC controller. Firmware updates, in some cases, may consume power, take time, and consume memory space within the HVAC controller. As such, one or more techniques of updating the carousel screens without updating the firmware of the HVAC controller may improve the HVAC controller as compared with HVAC controllers which do not update screens by populating templates.

In some examples, a system controls a set of heating, ventilation, and air conditioning (HVAC) components in order to regulate one or more parameters of a building. The system includes an HVAC controller device including a dial and a touch screen display. Additionally, the system includes an external server configured to communicate with the HVAC controller via a communication link. The external server is configured to receive data which indicates a set of information from one or more devices including the HVAC controller device, one or more external databases, one or more other devices, or any combination thereof. Additionally, the external server is configured to generate, based on the set of information and a set of screen templates stored in a memory of the external server, a screen for display by the touch screen display without updating firmware of the HVAC controller device, wherein the screen comprises a respective screen template of the set of screen templates which is populated with at least a portion of the set of information and output, to the HVAC controller device, the screen for display by the touch screen display.

In some examples, a method for controlling a set of heating, ventilation, and air conditioning (HVAC) components in order to regulate one or more parameters of a building includes receiving, by an external server configured to communicate with an HVAC controller device via a communication link, data which indicates a set of information from one or more devices including the HVAC controller device, one or more external databases, one or more other devices, or any combination thereof, wherein the HVAC controller device comprises a dial and a touch screen display. Additionally, the method includes generating, by the external server based on the set of information and a set of screen templates stored in a memory of the external server, a screen for display by the touch screen display without updating firmware of the HVAC controller device, wherein the screen comprises a respective screen template of the set of screen templates which is populated with at least a portion of the set of information and outputting, by the external server to the HVAC controller device, the screen for display by the touch screen display.

In some examples, a heating, ventilation, and air conditioning (HVAC) controller device includes a dial, a touch screen display, and processing circuitry, The processing circuitry is configured to receive, from an external server configured to communicate with the HVAC controller via a communication link, a screen for display by the touch screen display. The external server is configured to receive data which indicates a set of information from one or more devices including the HVAC controller device, one or more external databases, one or more other devices, or any combination thereof. Additionally, the external server is configured to generate, based on the set of information and a set of screen templates stored in a memory of the external server, the screen for display by the touch screen display without updating firmware of the HVAC controller device, wherein the screen comprises a respective screen template of the set of screen templates which is populated with at least a portion of the set of information.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
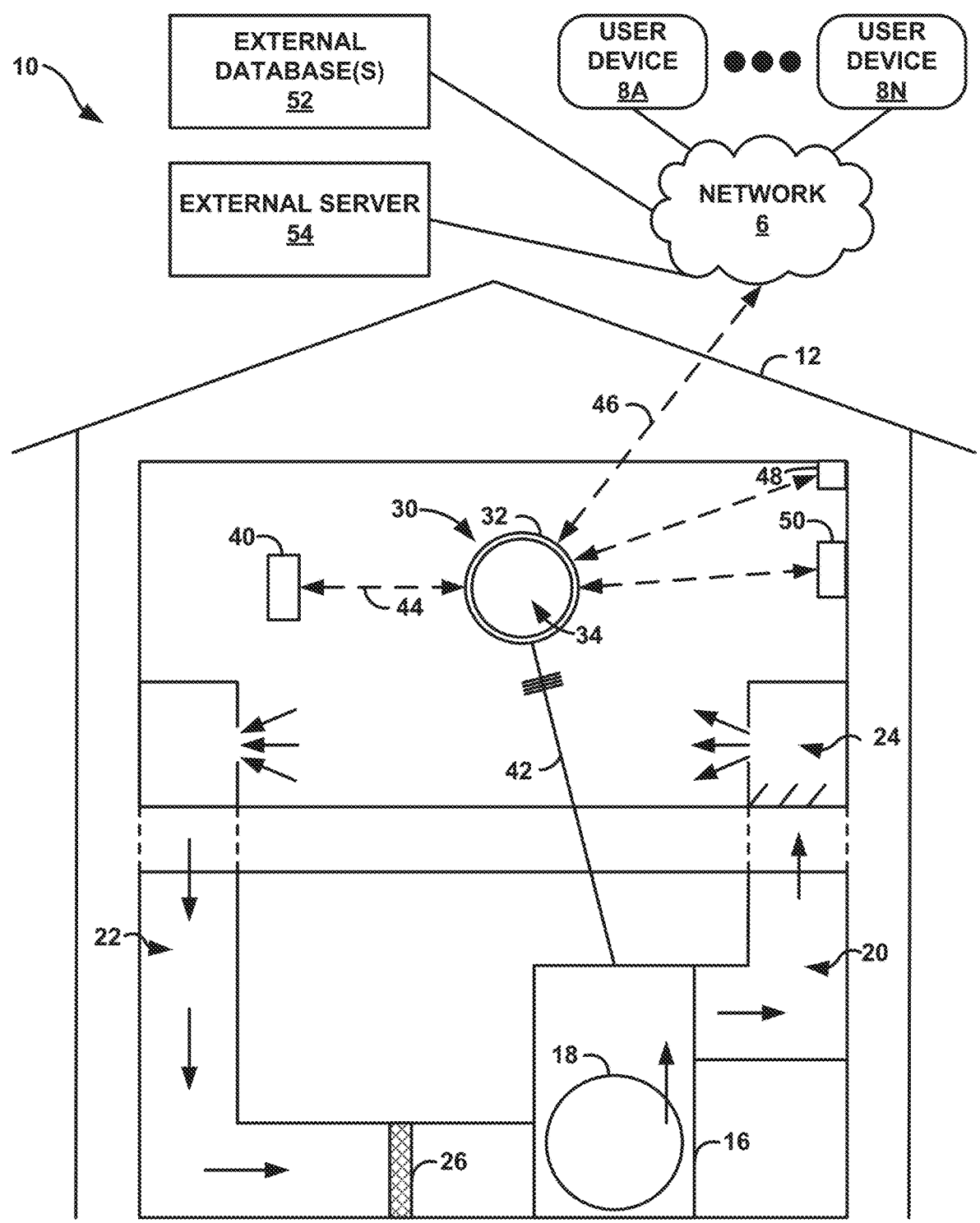
FIG. 1 is a block diagram illustrating a building control system in a building, in accordance with one or more techniques described herein.

FIG. 1 is a block diagram illustrating a building control system 10 in a building 12, in accordance with one or more techniques described herein. Building control system 10 includes one or more heating, ventilation, and air conditioning (HVAC) component(s) 16, a supply air duct 20, a return air duct 22 (collectively, "ducts 20, 22"), dampers 24, and air filters 26. Building control system 10 includes an HVAC controller 30 configured to control HVAC component(s) 16 to regulate one or more parameters within building 12. HVAC controller 30 may include a dial 32 and a touch screen display 34. Additionally, building control system 10 includes external database(s) 52 and external server 54 configured to communicate with HVAC controller 30 via network 6.

Building control system 10 may include one or more devices for regulating an environment within building 12. For example, HVAC controller 30 may be configured to control the comfort level (e.g., temperature and/or humidity) in building 12 by activating and deactivating HVAC component(s) 16 in a controlled manner. HVAC controller 30 may be configured to control HVAC component(s) 16 via a wired or wireless communication link 42. In some examples, a wired communication link 42 may connect HVAC component(s) 16 and HVAC controller 30. HVAC controller 30 may be a thermostat, such as, for example, a wall mountable thermostat. In some examples, HVAC controller 30 may be programmable to allow for user-defined temperature set points to control the temperature of building 12. Based on sensed temperature of building 12, HVAC controller 30 may turn on HVAC component(s) 16 or turn off HVAC component(s) 16 in order to reach the user-defined temperature set point. Although this disclosure describes HVAC controller 30 (and controllers shown in other figures) as controlling HVAC component(s) 16, external computing device 40 may also be configured to perform these functions. The techniques of this disclosure will primarily be described using examples related to temperature, but the systems, devices, and methods described herein may also be used in conjunction with other sensed properties, such as humidity or air quality. In some examples, HVAC controller 30 may be configured to control all of the critical networks of a building, including a security system.

HVAC component(s) 16 may provide heated air (and/or cooled air) via the ductwork throughout the building 12. As illustrated, HVAC component(s) 16 may be in fluid communication with one or more spaces, rooms, and/or zones in building 12 via ducts 20, 22, but this is not required. In operation, when HVAC controller 30 outputs a heat call signal to HVAC component(s) 16, HVAC component(s) 16 (e.g., a forced warm air furnace) may turn on (begin operating or activate) to supply heated air to one or more spaces within building 12 via supply air ducts 20. HVAC component(s) 16, which include an air movement device 18 (e.g., a blower or a fan), can force the heated air through supply air duct 20. In this example, cooler air from each space returns to HVAC component(s) 16 (e.g. forced warm air furnace) for heating via return air ducts 22. Similarly, when a cool call signal is provided by HVAC controller 30, a cooling device (e.g., an air conditioning (AC) unit) of HVAC component(s) 16 may turn on to supply cooled air to one or more spaces within building 12 via supply air ducts 20. Air movement device 18 may force the cooled air through supply air duct 20. In this example, warmer air from each space of building 12 may return to HVAC component(s) 16 for cooling via return air ducts 22.

In some examples, HVAC component(s) 16 may include any one or combination of a fan, a blower, a furnace, a heat pump, an electric heat pump, a geothermal heat pump, an electric heating unit, an AC unit, a humidifier, a dehumidifier, an air exchanger, an air cleaner, a damper, a valve, and a fan, however this is not required. HVAC component(s) 16 may include any device or group of devices which contributes to regulating the environment within building 12 based on signals received from HVAC controller 30 or contributes to regulating the environment within building 12 independently from HVAC controller 30.

Ducts 20, 22 may include one or more dampers 24 to regulate the flow of air, but this is not required. For example, one or more dampers 24 may be coupled to HVAC controller 30 and can be coordinated with the operation of HVAC component(s) 16. HVAC controller 30 may actuate dampers 24 to an open position, a closed position, and/or a partially open position to modulate the flow of air from the one or more HVAC components to an appropriate room and/or space in building 12. Dampers 24 may be particularly useful in zoned HVAC systems, and may be used to control which space(s) in building 12 receive conditioned air and/or receives how much conditioned air from HVAC component(s) 16.

In many instances, air filters 26 may be used to remove dust and other pollutants from the air inside building 12. In the example shown in FIG. 1, air filters 26 are installed in return air duct 22 and may filter the air prior to the air entering HVAC component(s) 16, but it is contemplated that any other suitable location for air filters 26 may be used. The presence of air filters 26 may not only improve the indoor air quality but may also protect the HVAC component(s) 16 from dust and other particulate matter that would otherwise be permitted to enter HVAC component(s) 16.

HVAC controller 30 may include any suitable arrangement of hardware, software, firmware, or any combination thereof. For example, HVAC controller 30 may include processing circuitry comprising microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry may include any suitable structure, whether in hardware, software, firmware, or any combination thereof, to perform the functions ascribed herein to HVAC controller 30.

Although not shown in FIG. 1, HVAC controller 30 may include a memory configured to store information within HVAC controller 30 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by the processing circuitry of HVAC controller 30. In some examples, the memory of HVAC controller 30 may be able to store data to and read data from memory included in external computing device 40 and/or memory included in external database(s) 52. The memory may be used for storing network settings such as an Internet Protocol (IP) address and/or a Media Access Control (MAC) address of HVAC controller 30, external computing device 40, and/or a router.

In some examples, HVAC controller 30 may include a set of wire terminals which make up a terminal block (e.g., a wall plate or a terminal plate) for receiving a set of control wires for one or more HVAC component(s) 16 of building control system 10. The memory of HVAC controller 30 may store one or more wiring configurations for HVAC component(s) 16, allowing HVAC controller 30 to determine which of HVAC component(s) 16 are connected to HVAC controller 30. The memory of HVAC controller 30 may also store settings for building control system 10 which correspond to the one or more wiring configurations for HVAC component(s) 16. For example, if HVAC controller 30 is wired to an AC unit of HVAC component(s) 16, HVAC controller 30 may determine one or more settings for controlling the AC unit to turn on and turn off. Additionally, in some examples, the memory of HVAC controller 30 may store program instructions, which may include one or more program modules, which are executable by HVAC controller 30. When executed by HVAC controller 30, such program instructions may cause HVAC controller 30 to provide the functionality ascribed to it herein. The program instructions may be embodied in software, firmware, and/or RAMware.

In some examples, HVAC controller 30 may include a dial 32 which is located at an outer circumference of HVAC controller 30. HVAC controller 30 may be fixed to a wall or another surface such that dial 32 may be rotated relative to one or more other components (e.g., touch screen display 34) of HVAC controller 30. Dial 32 may represent a user interface such that processing circuitry of HVAC controller 30 may receive, from dial 32 and/or dial circuitry electrically connected to dial 32, information indicative of a user input. In some examples, the user input may represent a user selection of a set point parameter value (e.g., a set point temperature), a user selection of information to be displayed by touch screen display 34 of HVAC controller 30, or a user selection of another setting. In some examples, dial 32 may smoothly rotate with respect to touch screen display 34. In some examples, dial 32 may rotate with one or more steps such that as dial 32 rotates, dial 32 "snaps" into position after every interval of rotational distance. In some examples, dial 32 may smoothly rotate with respect to touch screen display 34 and HVAC controller 30 may output an audio signal (e.g., a clicking noise) for every interval of rotational position (e.g., every one degree) in which dial 32 rotates, but this is not required. In some examples, dial 32 may rotate smoothly without outputting audio signals.

In some examples, dial 32 may include a set of light-emitting diodes (LEDs) configured to illuminate a portion or a whole of dial 32, but this is not required. The processing circuitry of HVAC controller 30 may selectively illuminate one or more LEDs of the set of LEDs in order to indicate a set point temperature or convey other information. In some examples, the set of LEDs included in dial 32 may illuminate dial 32 to indicate that building control system 10 is in a heating mode or indicate that building control system 10 is in a cooling mode. For example, when building control system 10 is in a heating mode (e.g., HVAC controller 30 is outputting one or more instructions for HVAC component(s) 16 to increase a temperature within building 12), the LEDs of dial 32 cause dial 32 to illuminate at a first color. When building control system 10 is in a cooling mode (e.g., HVAC controller 30 is outputting one or more instructions for HVAC component(s) 16 to decrease a temperature within building 12), the LEDs of dial 32 cause dial 32 to illuminate at a second color. In this way, the LEDs of dial 32 may indicate whether building control system 10 is operating in the heating mode or the cooling mode. Additionally, or alternatively, touch screen display 34 may display information indicating if building control system 10 is operating in the heating mode or indicating if building control system 10 is operating in the cooling mode.

Touch screen display 34 may include information relating to one or more aspects of an area in which HVAC controller 30 is located (e.g., a room in which HVAC controller 30 is located, a building in which HVAC controller 30 is located, an area outside of a building in which HVAC controller 30 is located, or any combination thereof). Additionally, or alternatively, touch screen display 34 may include information indicating a status of one or more devices integrated with HVAC controller 30. Touch screen display 34 is round (e.g., circular) in shape and touch screen display 34 may be located an area within a circumference of dial 32 such that dial 32 is visible at an outer circumference of touch screen display 34 from a perspective facing touch screen display 34. At least a portion of dial 32 and at least a portion of touch screen display 34 may represent an outer surface of HVAC controller 30, allowing dial 32 and touch screen display 34 to receive user input, such as receiving one or more user rotations of dial 32 and receiving one or more touch inputs to the touch screen display 34.

In some examples, touch screen display 34 represents a digital display configured to show at least one screen of a set of available screens stored in the memory of HVAC controller 30. The digital display may, in some examples, function as a touch screen user interface which may receive one or more touch inputs. Responsive to receiving touch inputs to touch screen display 34, HVAC controller 30 may control which information (e.g., which screen) is displayed by touch screen display 34, control one or more parameters (e.g., temperature set points) associated with HVAC controller 30, control one or more settings of HVAC controller 30, or any combination thereof. For example, touch screen display 34 permits a user to input various operating parameters (e.g., temperature set points, humidity set points, fan set points, starting times, ending times, schedule times, diagnostic limits, configuration settings, responses to alerts, and instructions to change a screen) to HVAC controller 30. In some examples, touch screen display 34 may represent a physical user interface that is accessible at HVAC controller 30 and may include a touch screen and/or a distinct keypad. In some examples, an entire surface of touch screen display 34 represents a touch screen configured to receive one or more touch inputs. Touch screen display 34 may include any suitable display. In some examples, touch screen display 34 may include any one or combination of a liquid crystal display (LCD), an e-ink display, fixed segment display, or a dot matrix LCD display. In one or more examples where touch screen display 34 includes a distinct keypad, the distinct keypad may include a numerical keypad, a system of buttons, a control knob, or any combination thereof. HVAC controller 30 may, in some cases, display information and/or accept user inputs via the user interface of external computing device 40.

A user may interact with HVAC controller 30 through a mobile phone, a tablet, a computer, or another device. For example, user devices 8A-8N (collectively, "user devices 8") may communicate with HVAC controller 30 via network 6. HVAC controller 30 may, in some examples, be configured to communicate directly with network 6 without communicating with network 6 via a gateway device (e.g., a Wi-Fi router) within building 12. In some examples, HVAC controller 30 may receive instructions from one or more of user devices 8. The instructions may include, for example, a request to change a set point temperature for an area within building 12. HVAC controller 30 may change the set point temperature in response to receiving the instruction. In turn, HVAC controller 30 may control HVAC component(s) 16 to control the temperature within building 12 to reach the new set point. Any action described herein as being performed by HVAC controller 30 in response to receiving one or more inputs to dial 32 and/or touch screen display 34 may additionally or alternatively be performed by HVAC controller in response to receiving one or more instructions from user devices 8.

In some examples, touch screen display 34 may include a presence sensitive device to detect user inputs to HVAC controller 30. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Touch screen display 34 of HVAC controller 30 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of HVAC controller 30 may allow a user to program settings of HVAC controller 30, set temperature zones for building 12, configure desired temperatures for building 12 for different times of the day or days of the week, or other operating parameters. Touch screen display 34 of HVAC controller 30 may also be used to present user queries (e.g., what room HVAC controller 30 is installed in, what the address of building 12 is, what HVAC component(s) 16 are connected to HVAC controller 30, etc.). Such queries may aid in installing and/or configuring HVAC controller 30 (e.g. when first connecting HVAC controller 30 to HVAC component(s) 16 of building control system 10).

In some examples, processing circuitry of HVAC controller 30 may be configured to determine a type of a user input received at touch screen display 34. For example, touch screen display 34 may be configured to receive "tap" touch inputs which represent a touch of one location on touch screen display 34 and touch screen display 34 may be configured to receive "swipe" touch inputs which represent a touch inputs that move across at least a portion of touch screen display 34. For example, a finger placed on one point of touch screen display 34 represents a tap touch input and a finger moving across screen display 34 represents a swipe touch input. The processing circuitry of HVAC controller 30 may be configured to determine a location at which touch screen display 34 receives a respective tap touch input. Additionally, or alternatively, the processing circuitry of HVAC controller 30 may be configured to determine a direction (e.g., left, right, up, or down) of a swipe touch input to HVAC controller 30.

In some examples, touch screen display 34 may be configured to display any one of a set of screens, wherein each screen of the set of screens is related to one or more parameters corresponding to the building 12 in which HVAC controller 30 is placed, one or more parameters corresponding to an environment outside of the building 12 in which HVAC controller 30 is placed, a status of one or more devices integrated with HVAC controller 30, one or more other types of information, or any combination thereof. For example, the set of screens may include a time and outdoor temperature screen, an inside temperature screen, an air quality screen, a water usage screen, an energy usage screen, and a security screen. In some examples, the processing circuitry of HVAC controller 30 may receive a signal indicative of a user selection of a screen of the set of screens for display by HVAC controller 30. For example, HVAC controller 30 may allow the set of screens to be scrolled across touch screen display 34.

In some examples, the set of screens may include a set of carousel screens, wherein each carousel screen of the set of carousel screens is associated with one or more respective themes of a set of themes. For example, the set of themes may include an indoor temperature theme, an outdoor temperature theme, an air quality theme, a water consumption theme, an energy consumption theme, and a security theme. When touch screen display 34 shows a carousel screen corresponding to the air quality theme, for example, touch screen display 34 may display information relating to an air quality within building 12 and/or an air quality outside of building 12. For example, touch screen display 34 may display an air quality value within building 12, wherein the air quality value is measured by an air quality sensor (not illustrated in FIG. 1) which is configured to communicate with HVAC controller 30 or located within HVAC controller 30. While touch screen display 34 displays the carousel screen corresponding to the air quality theme, however, touch screen display 34 might not display information corresponding to other themes, such as the temperature theme or the security theme, as examples.

In some examples, when a period of time elapses since a most recent user input is received by HVAC controller 30, HVAC controller 30 may enter an idle state. When HVAC controller 30 is in the idle state, the processing circuitry of HVAC controller 30 may output an idle screen for display by touch screen display 34. In some examples, the idle screen may include a set point temperature for an area within building 12 and/or a current temperature of the area within building 12, but this is not required. In some examples, HVAC controller 30 may select the idle screen based on user input received by HVAC controller 30. In some examples, HVAC controller 30 may select the idle screen based on information received from network 6. In any case, when the period of time elapses since HVAC controller 30 receives the most recent user input, HVAC controller 30 may enter the idle state and display the idle screen on touch screen display 34.

In some examples, responsive to detecting a rotation of dial 32 while HVAC controller 30 is in the idle mode, HVAC controller 30 transitions out of the idle mode to a temperature set point mode. HVAC controller 30 may change a temperature set point for an area within building 12 in response to detecting the rotation of dial 32. In other words, HVAC controller 30 may determine that a rotation of dial 32 while HVAC controller 30 is in the idle mode represents a user request to change a temperature set point. In transitioning out of the idle mode, the processing circuitry of HVAC controller 30 may display the temperature set point for the area within building 12 on touch screen display 34. Additionally, HVAC controller 30 may display the temperature set point changing as dial 32 rotates. For example, the touch screen display 34 may show the temperature setpoint cycle through a range of degrees, where each change from one degree to another degree is reflected on touch screen display 34. In some examples, HVAC controller 30 may emit a noise each time the temperature set point changes from one degree value to another degree value. The noise may represent a clicking noise a tapping noise, or another type of noise.

HVAC controller 30 may be configured to perform one or more other actions in response to a rotation of dial 32 in addition to changing the temperature set point or alternatively to changing the temperature set point. For example, touch screen display 34 may receive a touch input which causes HVAC controller 30 to transition from a temperature set point mode to a display screen mode. When HVAC controller 30 transitions to the display screen mode, HVAC controller 30 may change a screen displayed on touch screen display 34 in response to detecting a rotation of dial 32. For example, touch screen display 34 may display one or a set of carousel screens. The set of carousel screens form a sequence of carousel screens, such that a change from one carousel screen to another carousel screen represents a change to an adjacent carousel screen of the sequence of carousel screens. When dial 32 stops rotating, HVAC controller 30 may continue to display a carousel screen of the set of carousel screens displayed by touch screen display 34 at the time in which dial 32 stops rotating.

Additionally, or alternatively, HVAC controller 30 may be configured to change the carousel screen displayed by touch screen display 34 in response to one or more touch inputs to touch screen display 34 when HVAC controller is in the display screen mode. For example, the processing circuitry of HVAC controller 30 may detect a swipe touch input to touch screen display 34. In response to detecting the swipe touch input, HVAC controller 30 may transition touch screen display 34 from displaying a first carousel screen to a second carousel screen, where the first carousel screen and the second carousel screen are adjacent in the sequence of carousel screens. In this way, HVAC controller 30 may be configured to change the screen displayed on touch screen display 34 based on one or both of a rotation of dial 32 and a touch input to touch screen display 34.

It may be beneficial for HVAC controller 30 to have the ability to change the carousel screen based on one or both of the rotation of dial 32 and a touch input to touch screen display 34, so that a user interaction with HVAC controller 30 is improved as compared with HVAC controllers that do not allow display change based on more than one type of user input. In other words, by transitioning HVAC controller 30 from a set point mode where a temperature set point is changed responsive to a rotation of dial 32 to a display screen mode where the screen displayed by touch screen display 34 is changed responsive to a rotation of dial 32 and/or a touch input to touch screen display 34, HVAC controller 30 may provide a user with an efficient user experience.

In some examples, each carousel screen of the set of carousel screens comprises one or more corresponding idle screens and one or more corresponding details screens. Idle screens, carousel screens, and details screens may form a hierarchy where idle screens are above carousel screens in the hierarchy and carousel screens are above details screens in the hierarchy. HVAC controller 30 may transition between displaying idle screens, carousel screens, and details screens based on receiving user input, but this is not required. In some examples, HVAC controller 30 may transition between displaying idle screens, carousel screens, and details screens independently of user input.

HVAC controller 30 may include a communication device (not illustrated in FIG. 1) to allow HVAC controller 30 to communicate via a wired or wireless connection 44 to external computing device 40. The communication device may include a Bluetooth transmitter and receiver, a Wi-Fi transmitter and receiver, a Zigbee transceiver, a near-field communication transceiver, or other circuitry configured to allow HVAC controller 30 to communicate with external computing device 40. In some examples, the communication device may allow HVAC controller 30 to exchange data with external computing device 40. Examples of exchanged data include a desired temperature for building 12, HVAC component(s) 16 connected to HVAC controller 30, error codes, geographic location, estimated energy usage and cost, and/or other operating parameters or system performance characteristics for building control system 10.

HVAC controller 30 may communicate via wired or wireless connection 44 with external computing device 40. External computing device 40 may be, include, or otherwise be used in combination with a mobile phone, smartphone, tablet computer, personal computer, desktop computer, personal digital assistant, router, modem, remote server or cloud computing device, and/or related device allowing HVAC controller 30 to communicate over a communication network such as, for example, the Internet or other wired or wireless connection. Communicating via the wired or wireless connection 44 may allow HVAC controller 30 to be configured, controlled, or otherwise exchange data with external computing device 40. In some examples, HVAC controller 30 communicating via wired or wireless connection 44 may allow a user to set up HVAC controller 30 when first installing the controller in building 12. In some examples, HVAC controller 30 and external computing device 40 communicate through a wireless network device such as a router or a switch. In other examples, HVAC controller 30 and external computing device 40 communicate through a wired connection such as an ethernet port, USB connection, or other wired communication network.

HVAC controller 30 may, via the communication device, communicate via a wired or wireless connection 46 with external database(s) 52. In some examples, wired or wireless connection 46 enables HVAC controller 30 to communicate with external database(s) 52 via a wireless connection which includes a network device such as a router, ethernet port, or switch. HVAC controller 30 and external database(s) 52 may also communicate through a wired connection such as an ethernet port, USB connection, or other wired communication network. In some examples, HVAC controller 30 may communicate with external database(s) 52 directly without the assistance of a gateway device within building 12. Communicating via the wired or wireless connection 46 may allow HVAC controller 30 to exchange data with external database(s) 52. As such, external database(s) 52 may be at a location outside of building 12. In some examples, external database(s) 52 may be, include, or otherwise be used in combination with a remote server, cloud computing device, or network of controllers configured to communicate with each other. For example, HVAC controller 30 may check with HVAC controllers in nearby buildings through the internet or other city- or wide-area network. HVAC controller 30 may include the onboard database because it is unable to communicate via the communication device.

External server 54 may be configured to communicate with any one or combination of user devices 8, HVAC controller 30, external database(s) 52, and one or more devices integrated with HVAC controller 30 via network 6. In some examples, external server 54 is be configured to receive one or more sets of information, where each set of information of the one or more sets of information corresponds to a respective theme of the set of themes associated with the screens displayed by touch screen display 34.

External server 54 may be configured to receive data which indicates a set of information. Additionally, external server 54 may be configured to receive a set of carousel screen templates and store the set of carousel screen templates in a memory. Based on the set of information and the set of carousel screen templates, external server 54 is configured to generate a carousel screen for display by touch screen display 34 without updating firmware of HVAC controller 30, where the carousel screen corresponds to a respective carousel screen template of the set of carousel screen templates which is populated with at least a portion of the set of information. In some examples, external server 54 is configured to generate a sequence of carousel screens, each carousel screen of the sequence of carousel screens corresponding to a respective set of information received by external server 54. External server 54 generates a carousel screen by populating a carousel screen template of the set of carousel screen templates with at least a portion of the corresponding set of information. Subsequently, external server 54 may export the sequence of carousel screens to HVAC controller 30 for display by touch screen display 34.

Each carousel screen template of the set of carousel screen templates used to generate carousel screens for display by HVAC controller 30 is compatible with a firmware of HVAC controller 30 such that external server 54 can generate the sequence of carousel screen templates without updating the firmware of HVAC controller 30. Firmware updates are time consuming and consume memory space within the memory of HVAC controller 30. As such, it may be beneficial to limit a number and/or a volume of updates to the firmware of HVAC controller 30. By generating the sequence of carousel screens based on a set of firmware-compatible carousel screen templates, external server 54 may be configured to generate and update the sequence of carousel screens displayed by the touch screen display 34 more quickly and more memory efficiently than systems which need to update the firmware of an HVAC controller in order to generate and/or update screens displayed by such a controller.

As described herein, a "template" may represent a base screen which defines one or more areas for information to populate in. A template may represent a plurality of pixels which are arranged in a grid. Some of the pixels in the grid may be filled in and/or colored in order to define the one or more areas to be populated.

In some examples, external server 54 is configured to receive data from one or both of a first set of devices and a second set of devices. The first set of devices may include HVAC controller 30 and one or more devices integrated with HVAC controller 30. In some examples, at least one of the first set of devices is integrated with HVAC controller 30 in order to control HVAC component(s) 16 to regulate the one or more parameters of building 12. For example, the first set of devices may include air quality sensor 48. HVAC controller 30 may control HVAC component(s) 16 to regulate an air quality within building 12 based on data sensed by air quality sensor 48 and external server 54 may generate one or more screens for display by touch screen display 34 based on data sensed by air quality sensor 48. In some examples, at least one of the first set of devices is integrated with HVAC controller 30 in order to control one or more other aspects of building 12. For example, the first set of devices may include security device 50. external server 54 may generate one or more screens for display by touch screen display 34 based on a status of security device 50 (e.g., an armed/disarmed status of security device 50).

The second set of devices provide information corresponding to an environment outside of the building which is regulated by the HVAC controller. For example, the second set of devices may include external database(s) 52. External database(s) 52 may provide information corresponding to an environment outside of building 12, such as a temperature of the environment outside of building 12, a weather status outside of building 12, an air quality outside of building 12, or any combination thereof. In some examples, External database(s) 52 may include environmental data for a broad area (e.g., across most of the globe), and external server 54 may output a request for environmental data corresponding to an area in which building 12 is located. In turn, external server 54 may receive the environmental data corresponding to the area in which building 12 is located and generate one or more carousel screens based on the environmental data.

In some examples, external server 54 may generate one or more details screens corresponding to a carousel screen generated by external server 54. For example, external server 54 may generate the carousel screen by populating a carousel screen template with at least a portion of a set of information. Additionally, external server 54 may populate a details screen template with at least a portion of the set of information in order to generate a details screen, the detail screen corresponding to the carousel screen. In some examples, external server 54 stores the set of details screen templates in a memory. External server 54 may export the details screen to HVAC controller 30 along with the corresponding carousel screen.

Figure 2:
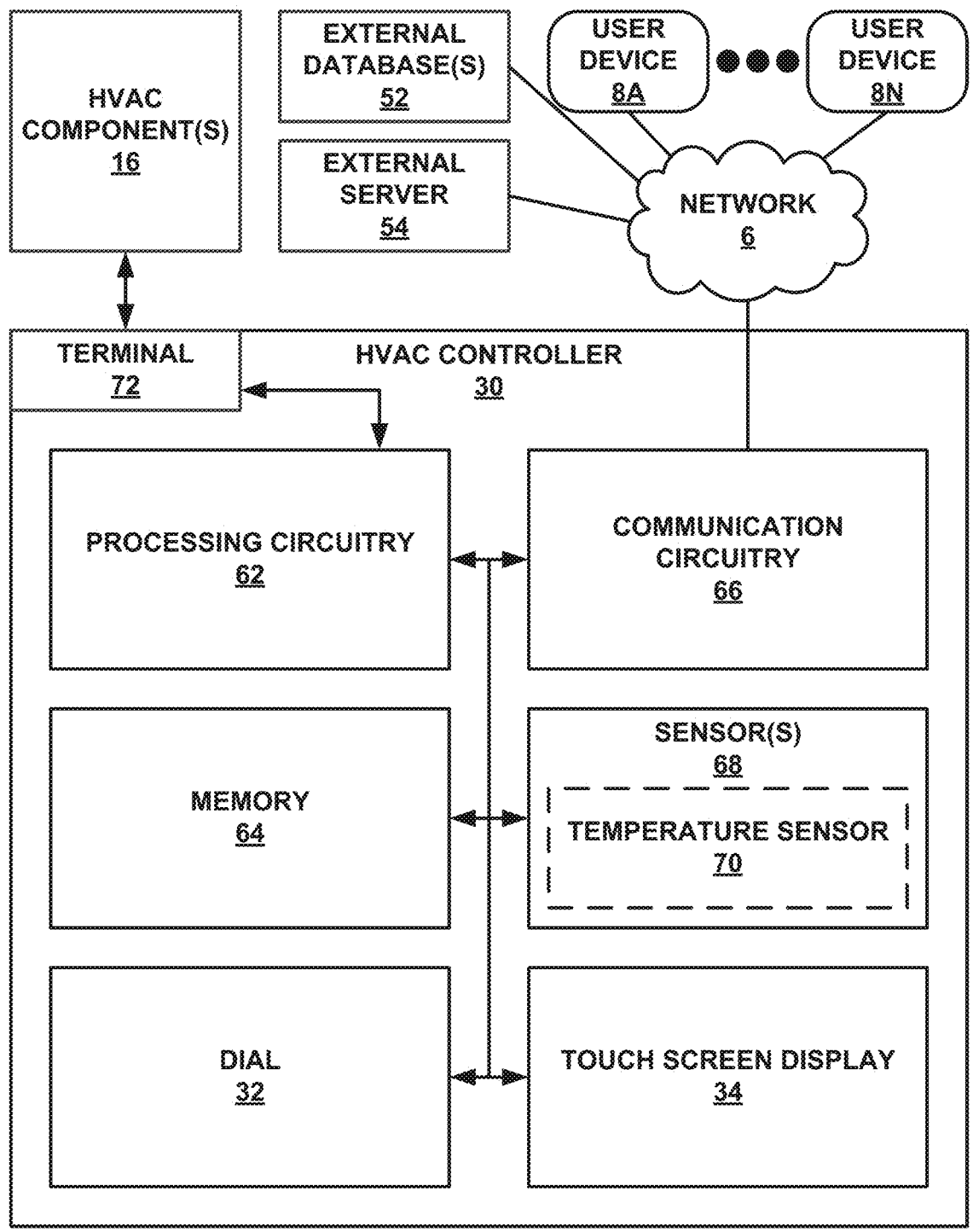
FIG. 2 is a block diagram illustrating an example configuration of a heating, ventilation, and air conditioning (HVAC) controller, in accordance with one or more techniques described herein.

FIG. 2 is a block diagram illustrating an example configuration of the HVAC controller 30 of FIG. 1, in accordance with one or more techniques described herein. As seen in FIG. 2, HVAC controller 30 includes dial 32, touch screen display 34, processing circuitry 62, memory 64, communication circuitry 66, sensor(s) 68, and terminal 72. Sensor(s) 68 may, in some examples, include a temperature sensor 70. HVAC controller 30 may be configured to communicate with HVAC component(s) 16 via terminal 72 and/or communicate with user devices 8, external database(s) 52, external server 54, or any combination thereof via network 6.

HVAC controller 30 may be configured to control HVAC component(s) 16 in order to regulate one or more parameters of a space (e.g., a building, one or more rooms within a building, a large vehicle, or a vessel). In some examples, HVAC controller 30 regulates a temperature within the space. HVAC controller 30 may regulate the temperature of the space by using HVAC component(s) 16 to decrease a temperature of the space if the current temperature of the space is greater than a first set point temperature and/or increase a temperature of the space using HVAC component(s) 16 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 62 may include microprocessors, DSPs, ASICs, FPGAs, or equivalent discrete or integrated logic circuitry, or a combination of any of the foregoing devices or circuitry. Accordingly, processing circuitry 62 may include any suitable structure, whether in hardware, software, firmware, or any combination thereof, to perform the functions ascribed herein to HVAC controller 30.

In some examples, memory 64 includes a computer-readable storage medium or computer-readable storage device. In some examples, memory 64 includes one or more of a short-term memory or a long-term memory. Memory 64 may include, for example, RAM, DRAM, SRAM, magnetic discs, optical discs, flash memories, or forms of EPROM or EEPROM. In some examples, memory 64 is used to store program instructions for execution by the processing circuitry 62. In some examples, the memory of HVAC controller 30 may be able to store data to and read data from memory included in external computing device 40 and/or memory included in external database(s) 52. The memory may be used for storing network settings such as an Internet Protocol (IP) address and/or a Media Access Control (MAC) address of HVAC controller 30, external computing device 40, and/or a router.

Communication circuitry 66 may include any suitable hardware, firmware, software or any combination thereof for communicating with another device, such as user devices 8 or other devices. Under the control of processing circuitry 62, communication circuitry 66 may receive downlink telemetry from, as well as send uplink telemetry to, one of user devices 8 or another device with the aid of an internal or external antenna. Communication circuitry 66 may include a Bluetooth transmitter and receiver, a Wi-Fi transmitter and receiver, a Zigbee transceiver, a near-field communication transceiver, or other circuitry configured to allow HVAC controller 30 to communicate with one or more remote devices such as user devices 8. In some examples, communication circuitry 66 may allow HVAC controller 30 to exchange data with external database(s) 52 and/or external server 54 via network 6. In some examples, communication circuitry 66 may allow HVAC controller 30 to exchange data with external computing device 40 of FIG. 1. Examples of exchanged data may include a desired temperature for the space, one or more control parameters for HVAC component(s) 16, error codes, geographic location, estimated energy usage and cost, and/or other operating parameters or system performance characteristics for HVAC component(s) 16. Additionally, or alternatively, examples of exchanged data may include one or more screens for display by touch screen display 34 and one or more instructions for displaying the screens. The one or more screens may include carousel screens, idle screens, details screens, or any combination thereof. In some examples, HVAC controller 30 may receive the one or more screens from external server 54 without updating a firmware of HVAC controller 30.

In some examples, HVAC controller 30 includes one or more sensor(s) 68 including temperature sensor 70. In some examples, temperature sensor 70 is located within a housing of HVAC controller 30. In some examples, temperature sensor 70 is located remotely from HVAC controller 30 and may communicate with HVAC controller 30 via communication circuitry 66 or terminal 72. For example, temperature sensor 70 may be located in the same room or the same area as HVAC controller 30 while being separate from HVAC controller 30 such that heat generated from components of HVAC controller 30 does not affect a temperature signal generated by temperature sensor 70. It may be beneficial for temperature sensor 70 to be located separately from HVAC controller 30 in order to obtain an accurate temperature reading. In some examples where temperature sensor 70 is located within the housing of HVAC controller 30, HVAC controller 30 may prevent components from affecting a temperature signal generated by temperature sensor 70. In some examples, at least a portion of the housing of HVAC controller 30 may include stainless steel and the housing may be coated with a material which hides fingerprints. In some examples, the term "housing" may be used herein to describe an outer surface of HVAC controller 30, including on outer surface of dial 32, an outer surface of touch screen display 34, and an outer face of HVAC controller 30 which is fixed to a wall or another surface.

In some examples, a housing of HVAC controller 30 may be substantially cylindrical in shape and dial 32 may represent a ring-shaped piece that is located at an outer circumference of HVAC controller 30. In some examples, HVAC controller 30 includes a first face configured to be mounted on a plate which is fixed to a wall or another surface, a second face including a display, and a third face representing a side of HVAC controller 30, the third face extending around a circumference of HVAC controller 30. Dial 32 may include the third face of HVAC controller 30. In some examples, dial 32 is configured to rotate with respect to one or more other components of HVAC controller 30. For example, dial 32 is configured to rotate with respect to touch screen display 34. In some examples, dial 32 is configured to rotate in response to a user input. Dial 32 may be electrically connected to dial circuitry (not illustrated in FIG. 2) which may generate an electrical signal indicative of one or more rotational parameters (e.g., a rotational position, a rotational velocity, and/or a rotational acceleration) of dial 32. The dial circuitry may output the electrical signal indicative of the one or more rotational parameters to processing circuitry 62. In some examples, the dial circuitry is part of processing circuitry 62.

Touch screen display 34 may be located on a face (e.g., the second face) of HVAC controller 30. In some examples, touch screen display 34 may, in some cases, be substantially circular in shape. In some examples, touch screen display 34 may include a presence sensitive device to detect user inputs to HVAC controller 30. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Touch screen display 34 of HVAC controller 30 may function as an output device using any one or more display devices, such as an LCD, dot matrix display, LED display, OLED display, e-ink, or similar monochrome or color display capable of outputting visible information to a user.

In some examples, touch screen display 34 may display a set of carousel screens, which may represent a sequence of screens. In some examples, each screen of the set of carousel screens may be related to one or more parameters of an environment in which HVAC controller 30 is located, one or more settings of HVAC controller 30, and/or one or more other aspects associated with HVAC controller 30. For example, the set of carousel screens may include a time & outdoor temperature screen, a comfort (e.g., inside temperature) screen, an air quality screen, a water screen, an energy screen, and a security screen. In some examples, touch screen display 34 may scroll through the carousel of screens based on two or more kinds of user input, such as a rotation of dial 32 and/or swipe inputs received by touch screen display 34. In some examples, touch screen display 34 may scroll through the carousel of screens without user input.

Processing circuitry 62 may be configured to set and/or change one or more temperature set points corresponding to a space (e.g., a space within building 12). For example, a first set point temperature may represent a cooling set point temperature and a second set point temperature may represent a heating set point temperature. In some examples, if HVAC controller 30 is in a cooling mode and the current temperature is greater than the cooling set point temperature, processing circuitry 62 may control HVAC component(s) 16 to regulate the temperature in the space to reach the cooling set point temperature over a period of time based on the current temperature and the cooling set point temperature. In some examples, if HVAC controller 30 is in a heating mode and the current temperature is less than the heating set point temperature, processing circuitry 62 may control HVAC component(s) 16 to regulate the temperature in the space to reach the heating set point temperature over a period of time based on the current temperature and the heating set point temperature.

In some example, processing circuitry 62 is configured to receive an instruction to change and/or set one or more temperature set points of HVAC controller 30 from dial circuitry electrically connected to dial 32, where the instruction is indicative of a user selection of one or more temperature set points using dial 32. For example, in response to a first rotation of dial 32, processing circuitry 62 may set the cooling temperature set point value to a first temperature value if a cooling set point mode of HVAC controller 30 is activated. In response to a second rotation of dial 32, processing circuitry 62 may set the heating temperature set point value to a second temperature value if a heating set point mode of HVAC controller 30 is activated. Processing circuitry 62 may control whether HVAC controller is in the heating set point mode or the cooling set point mode based on one or more user inputs received from touch screen display 34. In some examples, processing circuitry 62 is configured to receive an instruction to change and/or set one or more temperature set points of HVAC controller 30 from one or more of user devices 8 via network 6. In any case, processing circuitry 62 may change the one or more temperature set points in response receiving instructions to change the one or more temperature set points.

Figure 3:
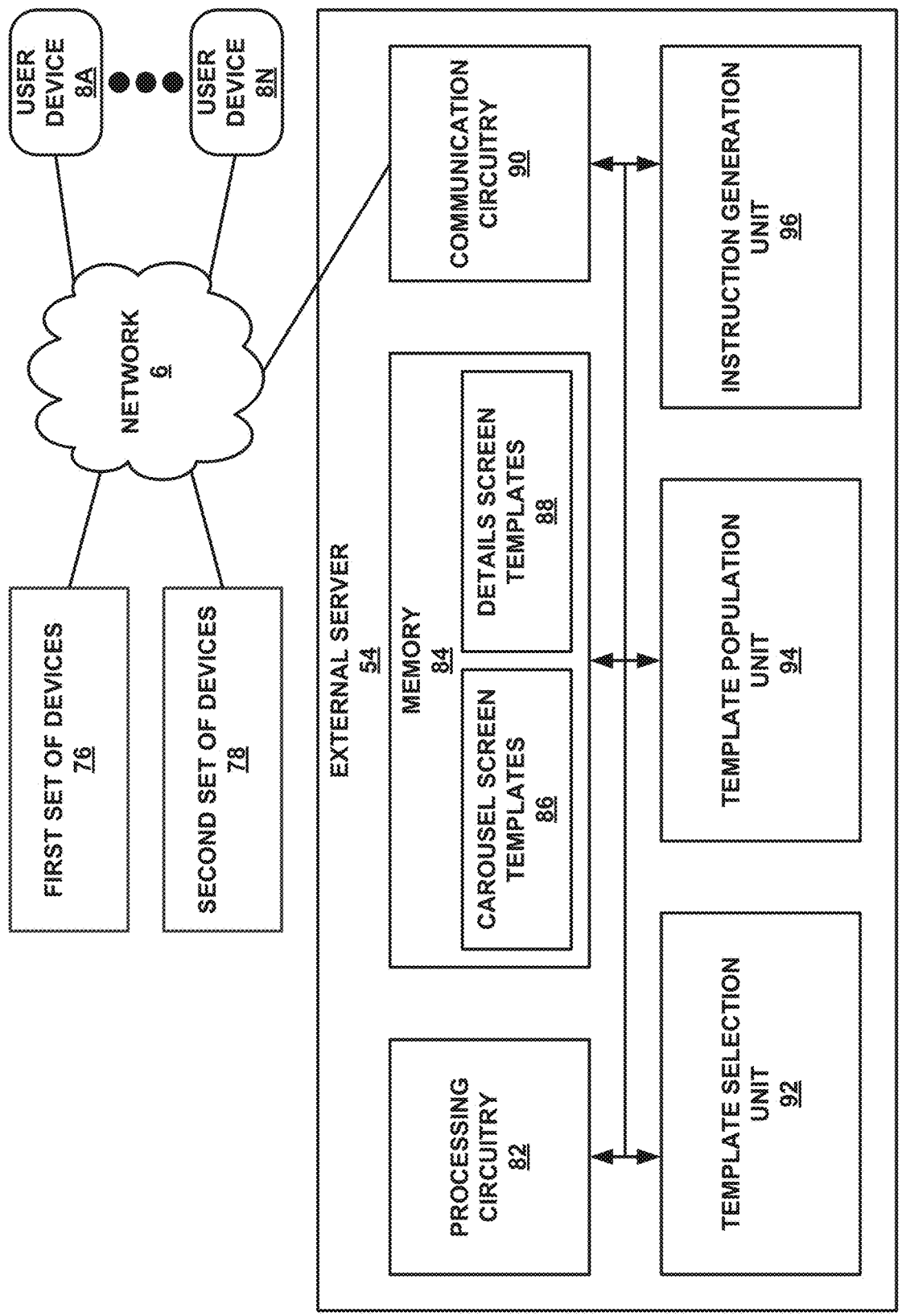
FIG. 3 is a block diagram illustrating an example external server, in accordance with the techniques of this disclosure.

FIG. 3 is a block diagram illustrating an example external server 54, in accordance with the techniques of this disclosure. One or more aspects of external server 54 of FIG. 2 may be described within the context of building control system 10 of FIG. 1. The architecture of external server 54 illustrated in FIG. 3 is shown for exemplary purposes only. External server 54 should not be limited to the illustrated example architecture. In other examples, external server 54 may be configured in a variety of ways. External server 54 may be configured to communicate with user devices 8, a first set of devices 76, and a second set of devices 78, or any combination thereof via network 6. Memory 84 stores, in some examples, a set of carousel screen templates 86 and a set of details screen templates 88.

The first set of devices 76 may include HVAC controller 30 and one or more other devices which are integrated with HVAC controller 30 as a part of the building control system 10. A device which is referred to herein as being "integrated" may represent a device which interacts as a part of a network of devices which control one or more parameters within building 12 or perform one or more other functions corresponding to building 12. For example, air quality sensor 48 and security device 50 may be integrated with HVAC controller 30. Consequently, HVAC controller 30, air quality sensor 48, security device 50 are a part of the first set of devices 76. The second set of devices 78 may include one or more devices which are not integrated with HVAC controller 30. A device which is referred to herein as being "not integrated" represents a device which does not function as a part of the network of devices which control one or more parameters within building 12 and does not perform one or more other functions corresponding to building 12. For example, external database(s) 52 are not integrated with HVAC controller 30 and external database(s) 52 are part of the second set of devices 78.

As shown in the example of FIG. 3, external server 54 includes processing circuitry 82, memory 84, and communication circuitry 90. External server 54 also includes a template selection unit 92, a template population unit 94, and an instruction generation unit 96, which may be implemented as program instructions and/or data stored in memory 84 and executable by processing circuitry 82. Memory 84 of external server 54 may also store an operating system (not illustrated in FIG. 2) executable by processing circuitry 82 to control the operation of components of external server 54. The components, units, or modules of external server 54 are coupled (physically, communicatively, and/or operatively) using communication channels for inter-component communications. In some examples, the communication channels may include a system bus, a network connection, an inter-process communication data structure, or any other method for communicating data.

Processing circuitry 82, in one example, may comprise one or more processors that are configured to implement functionality and/or process instructions for execution within external server 54. For example, processing circuitry 82 may be capable of processing instructions stored by memory 84. Processing circuitry 82 may include, for example, microprocessors, DSPs, ASICs, FPGAs, or equivalent discrete or integrated logic circuitry, or a combination of any of the foregoing devices or circuitry.

Memory 84 may be configured to store information within external server 54 during operation. Memory 84 may include a computer-readable storage medium or computer-readable storage device. In some examples, memory 84 include one or more of a short-term memory or a long-term memory. Memory 84 may include, for example, RAM, DRAM, SRAM, magnetic discs, optical discs, flash memories, or forms of EPROM or EEPROM. In some examples, memory 84 is used to store program instructions for execution by processing circuitry 82. Memory 84 may be used by software or applications running on external server 54 to temporarily store information during program execution.

Communication circuitry 90 may include any suitable hardware, firmware, software or any combination thereof for communicating with other devices, such as user devices 8, first set of devices 76, second set of devices 78, or any combination thereof via network 6. Communication circuitry 90 may include a Bluetooth transmitter and receiver, a Wi-Fi transmitter and receiver, a Zigbee transceiver, a near-field communication transceiver, or other circuitry configured to allow external server 54 to communicate with one or more devices such as user devices 8, first set of devices 76, second set of devices 78, or any combination thereof.

In some examples, external server 54 may generate one or more carousel screens by receiving data which indicates a set of information and generating, based on the set of information and the set of carousel screen templates 86 stored in memory 84, a carousel screen for display by touch screen display 34 of HVAC controller 30 without updating firmware of HVAC controller 30. For example, the carousel screen includes a respective carousel screen template of the set of carousel screen templates 86 which is populated with at least a portion of the set of information received by external server 54.

In some examples, the set of carousel screen templates 86 includes an integrated device carousel screen template, a non-integrated device carousel screen template, and a device status only carousel screen template. In some examples, each carousel screen template of the set of carousel screen templates 86 includes an icon at a center of the respective carousel screen templates. The icon may, in some cases, represent a building (e.g., a house, a commercial building, or an office building). For example, when HVAC controller 30 is installed within a house, the icon in the center of each of carousel screen templates 86 may represent an outline of a house.

The integrated device carousel screen template of the set of carousel screen templates 86 may include one or more spaces for displaying information collected by any one or combination of the first set of devices 76 and one or more spaces for displaying information collected by any one or combination of the second set of devices 78. For example, the integrated device carousel screen template may include one or more first spaces for displaying information corresponding to a status of an environment within building 12 and one or more second spaces for displaying information corresponding to a status of an environment outside of building 12. At least one of the one or more first spaces may be located within a boundary of the icon at the center of the integrated device carousel screen template. The one or more second spaces may be located outside the boundary of the icon. Consequently, the integrated device carousel screen template may include at least some information pertaining to the environment within building 12.

The non-integrated device carousel screen template of the set of carousel screen templates 86 includes one or more spaces for displaying information collected by any one or combination of the second set of devices 78 and does not include space for displaying information collected by the first set of devices 76. In some examples, the non-integrated device carousel screen template includes space for displaying an indication that information from integrated devices is missing. Additionally, the device status only carousel screen template may include one or more spaces for indicating a status of any one or combination of first devices 76. In some cases, the device status only carousel screen template does not include space for displaying information corresponding to an environment within building 12 or outside of building 12 (e.g., a temperature value, an air quality status, a humidity value, or another parameter value). In one example, the device status only carousel screen template may include a space for displaying a status (e.g., armed or not armed) of security device 50.

The set of details screen templates 88 includes an integrated device details screen template and a non-integrated device details screen template, where the integrated device details screen template corresponds to the integrated device carousel screen template and the non-integrated device details screen template corresponds to the non-integrated device carousel screen template. In some examples, the set of details screen templates 88 does not include a template corresponding to the device status only carousel screen template.

Processing circuitry 82 may execute template selection unit 92 in order to select a carousel screen of the set of carousel screen templates 86. For example, external server 54 may receive data which indicates a set of information. In some examples, external server 54 receives the data from one or both of the first set of devices 76 and the second set of devices 78. Processing circuitry may execute the template selection unit 92 in order to select the carousel screen of the set of carousel screen templates 86 based on a content of the set of information indicated by the data.

Template selection unit 92 may determine that the data includes data received from at least one device of the first set of devices 76 and determine that the data includes data includes data received from at least one device of the second set of devices 78. Responsive to determining that the data includes data received from both of the first set of devices 76 and the second set of devices 78, template selection unit 92 may select the integrated device carousel screen template from the set of carousel screen templates 86. Since the data is received from both of the first set of devices 76 and the second set of devices 78, the data includes at least some data received from integrated devices and at least some data received from non-integrated devices. Consequently, template selection unit 92 may select the integrated device carousel screen because it includes both of one or more spaces for information corresponding to integrated devices and one or more spaces for information corresponding to non-integrated devices.

In some examples, template selection unit 92 may determine that the data received by external server 54 includes data received from at least one device of the second set of devices 78 and does not include data received from at least one device of the first set of devices 76. Responsive to determining that the data includes data received from at least one device of the second set of devices 78 and does not include data received from at least one device of the first set of devices 76, template selection unit 92 may select the non-integrated device carousel screen template from the set of carousel screen templates 86. Since the data is received from only the second set of devices 78, the data only includes data received from non-integrated devices and does not include data from integrated devices. Consequently, template selection unit 92 may select the non-integrated device carousel screen template because it includes one or more spaces for information corresponding to non-integrated devices and does not include space for information corresponding to integrated devices. However, the non-integrated device carousel screen template may include space for an indication that information from an integrated device is missing.

In some examples, template selection unit 92 may determine that the data includes data received from at least one device of the first set of devices 76, wherein the data represents a status of the one or more of the first set of devices. Responsive to determining that the data represents the status of the one or more of the first set of devices, template selection unit 92 may select the device status only carousel screen template.

Responsive to template selection unit 92 selecting a carousel screen template of the respective set of carousel screen templates 86, processing circuitry 82 may execute template population unit 94 in order to populate the selected carousel screen template with at least a portion of the set of information indicated by the data received by external server 54. For example, when the data includes a temperature value corresponding to a space inside building 12 collected by one of the first set of devices 76 and a temperature value corresponding to an area outside building 12 received from one of the second set of devices 78, the selected carousel screen template may represent the integrated device carousel screen template. Template population unit 94 may populate the integrated device carousel screen template to indicate both of the temperature of the area inside building 12 and the temperature of the area outside of building 12. In some examples, when the data includes a temperature value corresponding to an area outside building 12 received from one of the second set of devices 78 and does not include a temperature of an area within building 12 received from the first set of devices 76, the selected carousel screen template may represent the non-integrated device carousel screen template. Template population unit 94 may populate the non-integrated device carousel screen template to indicate the temperature value corresponding to the area outside building 12 and indicate that temperature data from the first set of devices 76 is missing.

In any case, processing circuitry 82 may execute template population unit 94 in order to populate a respective carousel screen template which is selected by template selection unit 92 in response to receiving data indicative of a set of information and generate a respective carousel screen. In some examples, template population unit 94 may generate a sequence of carousel screens, where each carousel screen of the sequence of carousel screens corresponds to respective data received by external server 54. External server 54 may export the sequence of carousel screens to HVAC controller 30 for display by the touch screen display 34. In some examples, processing circuitry 82 may execute template population unit 94 in order to generate one or more details screens. For example, population unit 94 may generate a details screen corresponding to at least one carousel screen of the set of carousel screens.

In some examples, processing circuitry 82 may execute instruction generation unit 96 in order to generate one or more instructions for displaying screens generated by template population unit 94. The instructions, for example, may indicate whether a particular carousel screen is to be displayed by touch screen display 34 as a default carousel screen.

Figure 4:
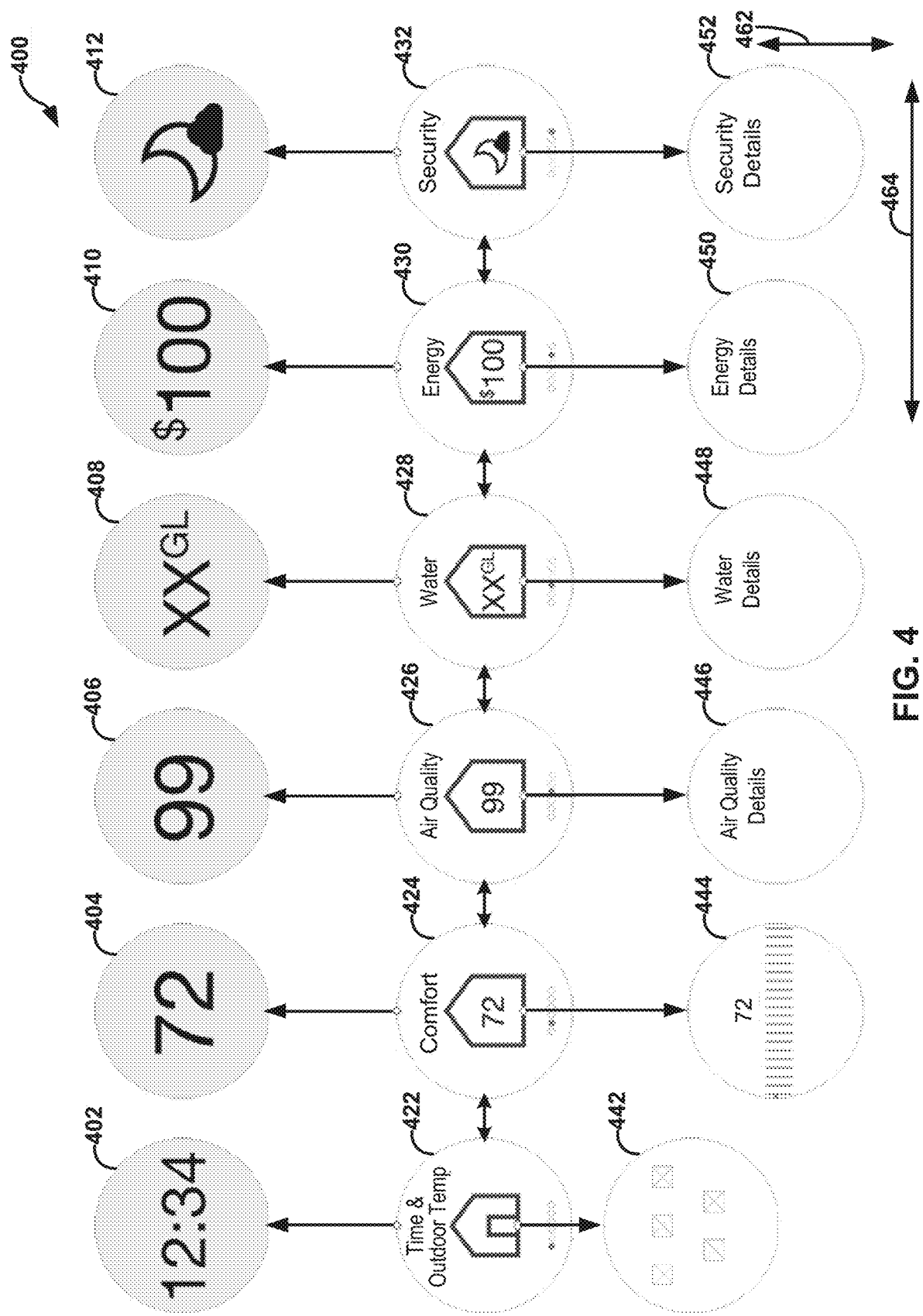
FIG. 4 is a conceptual diagram illustrating an example screen hierarchy for one or more screens which may be displayed by a touch screen display, in accordance with one or more techniques described herein.

FIG. 4 is a conceptual diagram illustrating an example screen hierarchy for one or more screens 400 which may be displayed by touch screen display 34, in accordance with one or more techniques described herein. The one or more screens 400 include idle screens 402-412, carousel screens 422-432, and details screens 442-452. FIG. 4 is described with respect to building control system 10, HVAC controller 30, and external server 54 of FIGS. 1-3. However, the techniques of FIG. 4 may be performed by different components of building control system 10, HVAC controller 30, external server 54 or by additional or alternative systems or devices.

Processing circuitry 62 is configured to control which of screens 400 is displayed by touch screen display 34 at any given point in time. In some examples, processing circuitry 62 may change the screen displayed by touch screen display 34 in response to receiving one or more user inputs. In some examples, processing circuitry 62 may automatically change the screen displayed by touch screen display 34 without receiving any user inputs. Screens 400 are organized in a hierarchy which determines a manner in which processing circuitry 62 sets, changes, and transitions the screen displayed by touch screen display 34. As seen in FIG. 4, idle screens 402-212 are located at a "top" of the hierarchy, carousel screens 422-432 are located below the idle screens 402-212 in the hierarchy, and details screens 442-452 are located below the carousel screens 422-432 in the hierarchy at the "bottom" of the hierarchy.

Screen transitions in the vertical direction 462 may be referred to herein as "vertical transitions." Screen transitions in the horizontal direction 464 may be referred to herein as "horizontal transitions." For example, a transition from displaying carousel screen 428 on touch screen display 34 to displaying idle screen 408 on touch screen display 34 may represent a vertical transition, since the transition is an upwards moment through the hierarchy along vertical direction 462. A transition from displaying carousel screen 428 on touch screen display 34 to displaying carousel screen 430 on touch screen display 34 may represent a horizontal transition, since the transition is a sideways moment through the hierarchy along horizontal direction 464. A group of screens which are arranged vertically in the hierarchy may be referred to as a "vertical grouping of screens." For example, idle screen 404, carousel screen 424, and details screen 444 represent a vertical grouping of screens since idle screen 404 is an idle screen corresponding to carousel screen 424 and details screen 444 is a details screen corresponding to carousel screen 424.

In some examples, processing circuitry 62 selects a vertical grouping of screens as a default vertical grouping of screens. The default vertical group of screens represents a vertical group of screens which HVAC controller 30 defaults to while HVAC controller 30 is in an idle state. HVAC controller 30 may enter the idle state when a period of time elapses following a most recent user input to HVAC controller 30. HVAC controller 30 may remain in the idle state until HVAC controller 30 receives a user input. In one example, processing circuitry 62 may select idle screen 404, carousel screen 424, and details screen 444 (collectively, "screens 404, 424, 444") as the default vertical group of screens. During the idle mode, processing circuitry 62 may output the idle screen of the default vertical group of screens for display by touch screen display 34. As such, when screens 404, 424, 444 represent the default vertical group of screens, processing circuitry 62 displays idle screen 404 while HVAC controller 30 is in the idle mode. When HVAC controller 30 receives a user input (e.g., a touch input to touch screen display 34) after a time when HVAC controller 30 is in the idle mode, processing circuitry 62 may vertically transition from displaying idle screen 404 to displaying carousel screen 424 on touch screen display 34.

When processing circuitry 62 displays carousel screen 424 in response to a user touch input to touch screen display 34, HVAC controller 30 may be in a display screen mode, and processing circuitry 62 may transition the screen displayed by touch screen display 34 based on one or both of swipe inputs to touch screen display 34 and rotations of dial 32. That is, processing circuitry 62 may transition from displaying carousel screen 424 to displaying carousel screen 426 in response to detecting a rightward swipe input to touch screen display 34 or detecting a rightward rotation of dial 32 and processing circuitry 62 may transition from displaying carousel screen 424 to displaying carousel screen 422 in response to detecting a leftward swipe input to touch screen display 34 or detecting a leftward rotation of dial 32. It may be beneficial for processing circuitry 62 to change the carousel screen based on two or more types of user input, such as rotations of dial 32 and/or swipe inputs to touch screen display 34, so that a user experience with HVAC controller 30 is improved as compared with one or more HVAC controllers which do not change display screens based on two or more types of user input. Additionally, in some cases, it may be beneficial for processing circuitry 62 to change the carousel screen specifically based on rotations of dial 32 and/or swipe inputs to touch screen display 34 since rotating dial 32 and swiping on touch screen display 34 represent easy and natural ways to interact with HVAC controller 30.

In some examples, processing circuitry 62 may cycle through more than one carousel screen of carousel screens 422-432 within a short period of time (e.g., less than 10 seconds). For example, processing circuitry 62 may transition from one carousel screen to another carousel screen after detecting a rotation of dial 32 by a threshold number of degrees. In other words, if dial 32 rotates continuously, processing circuitry 62 may cycle through several carousel screens. When dial 32 stops rotating, processing circuitry 62 may maintain a current carousel screen for display by touch screen display 34. For example, in response to one rotation of dial 32, processing circuitry 62 may transition from carousel screen 424 to carousel screen 426, transition from carousel screen 426 to carousel screen 428, and transition from carousel screen 428 to carousel screen 430. Processing circuitry 62 may stop transitioning carousel screens at carousel screen 430 when dial 32 stops rotating. Subsequently, processing circuitry 62 may detect a "tap" touch input to touch screen display 34, causing processing circuitry 62 to transition carousel screen 430 to details screen 450.

In some examples, processing circuitry 62 may transition from displaying one carousel screen to an adjacent carousel screens in response to detecting one swipe input to touch screen display 34. A swipe input may represent a horizontal user touch movement across touch screen display 34. Horizontal swipe inputs may include rightwards swipe inputs and leftwards swipe inputs. When processing circuitry 62 detects two consecutive rightwards swipe inputs to touch screen display 34, processing circuitry 62 may transition from displaying carousel screen 424 to displaying carousel screen 426 responsive to the first rightwards swipe and transition from displaying carousel screen 426 to displaying carousel screen 428 responsive to the second rightwards swipe.

Processing circuitry 62 may transition from a carousel screen to a respective details screen in response to receiving a tap input to touch screen display 34. When touch screen display 34 is displaying carousel screen 422, processing circuitry 62 may transition touch screen display 34 from displaying carousel screen 422 to displaying details screen 442 responsive to detecting a tap input to touch screen display 34. When touch screen display 34 is displaying carousel screen 424, processing circuitry 62 may transition touch screen display 34 from displaying carousel screen 424 to displaying details screen 444 responsive to detecting a tap input to touch screen display 34. When touch screen display 34 is displaying carousel screen 426, processing circuitry 62 may transition touch screen display 34 from displaying carousel screen 426 to displaying details screen 446 responsive to detecting a tap input to touch screen display 34. When touch screen display 34 is displaying carousel screen 428, processing circuitry 62 may transition touch screen display 34 from displaying carousel screen 428 to displaying details screen 448 responsive to detecting a tap input to touch screen display 34. When touch screen display 34 is displaying carousel screen 430, processing circuitry 62 may transition touch screen display 34 from displaying carousel screen 430 to displaying details screen 450 responsive to detecting a tap input to touch screen display 34. When touch screen display 34 is displaying carousel screen 432, processing circuitry 62 may transition touch screen display 34 from displaying carousel screen 432 to displaying details screen 452 responsive to detecting a tap input to touch screen display 34.

Processing circuitry 62 may transition from displaying a carousel screen to displaying a corresponding idle screen in response to a period of time elapsing since a most recent user input to HVAC controller 30. In some examples, the period of time is 45 seconds. When touch screen display 34 displays carousel screen 422 for a period of time after a most recent user input to HVAC controller 30, processing circuitry 62 may transition to displaying idle screen 402 on touch screen display 34. When touch screen display 34 displays carousel screen 424 for a period of time after a most recent user input to HVAC controller 30, processing circuitry 62 may transition to displaying idle screen 404 on touch screen display 34. When touch screen display 34 displays carousel screen 426 for a period of time after a most recent user input to HVAC controller 30, processing circuitry 62 may transition to displaying idle screen 406 on touch screen display 34. When touch screen display 34 displays carousel screen 428 for a period of time after a most recent user input to HVAC controller 30, processing circuitry 62 may transition to displaying idle screen 408 on touch screen display 34. When touch screen display 34 displays carousel screen 430 for a period of time after a most recent user input to HVAC controller 30, processing circuitry 62 may transition to displaying idle screen 410 on touch screen display 34. When touch screen display 34 displays carousel screen 432 for a period of time after a most recent user input to HVAC controller 30, processing circuitry 62 may transition to displaying idle screen 412 on touch screen display 34.

Processing circuitry 62 of may be configured to cause a set point to change in response to receiving a first rotation input via a dial 32 while touch screen display 34 displays a first screen. In some examples, the first screen includes one of idle screens 402-412 or one of carousel screens 422-432. As such, a default function of dial 32 may be to control one or more set point temperature values. Subsequently, processing circuitry 62 may be configured to cause a menu of options to be displayed on touch screen display 34 to change in response to receiving a touch input at the touch screen display while the touch screen display displays the first screen. In some examples, the first touch input represents a user selection of a menu button on one of carousel screens 422-432, causing touch screen display 34 to display a corresponding one of details screens 442-452.

Processing circuitry 62 is configured to cause a selection being displayed on touch screen display 34 to change in response to receiving a rotation input via dial 32 while touch screen display 34 a second screen. In other words, while touch screen display 34 displays one of details screens 442-452, dial 32 may control the selection being displayed on touch screen display 34 rather than controlling one or more temperature set points. Additionally, processing circuitry 62 may cause the selection being displayed on touch screen display 34 touch screen display while the touch screen display 34 displays the second screen. In other words, touch input to touch screen display 34 may control the selection being displayed on touch screen display 34 in a similar manner to a rotation of dial 32 while touch screen display 34 displays one of details screens 442-452. Thus, when some screens are being displayed dial 32 and touch screen display 34 may functional as alternative inputs that perform the same function, e.g., navigating a menu hierarchy. When other screens are being displayed, dial 32 and touch screen display 34 may perform different functions. As one example, when an idle screen or home screen is being displayed a rotation of dial 32 may cause a setpoint to change whereas a touch input at touch screen display 34 may cause a menu option to be selected. In some examples, touch screen display 34 is a full color touch screen.

Figure 5:
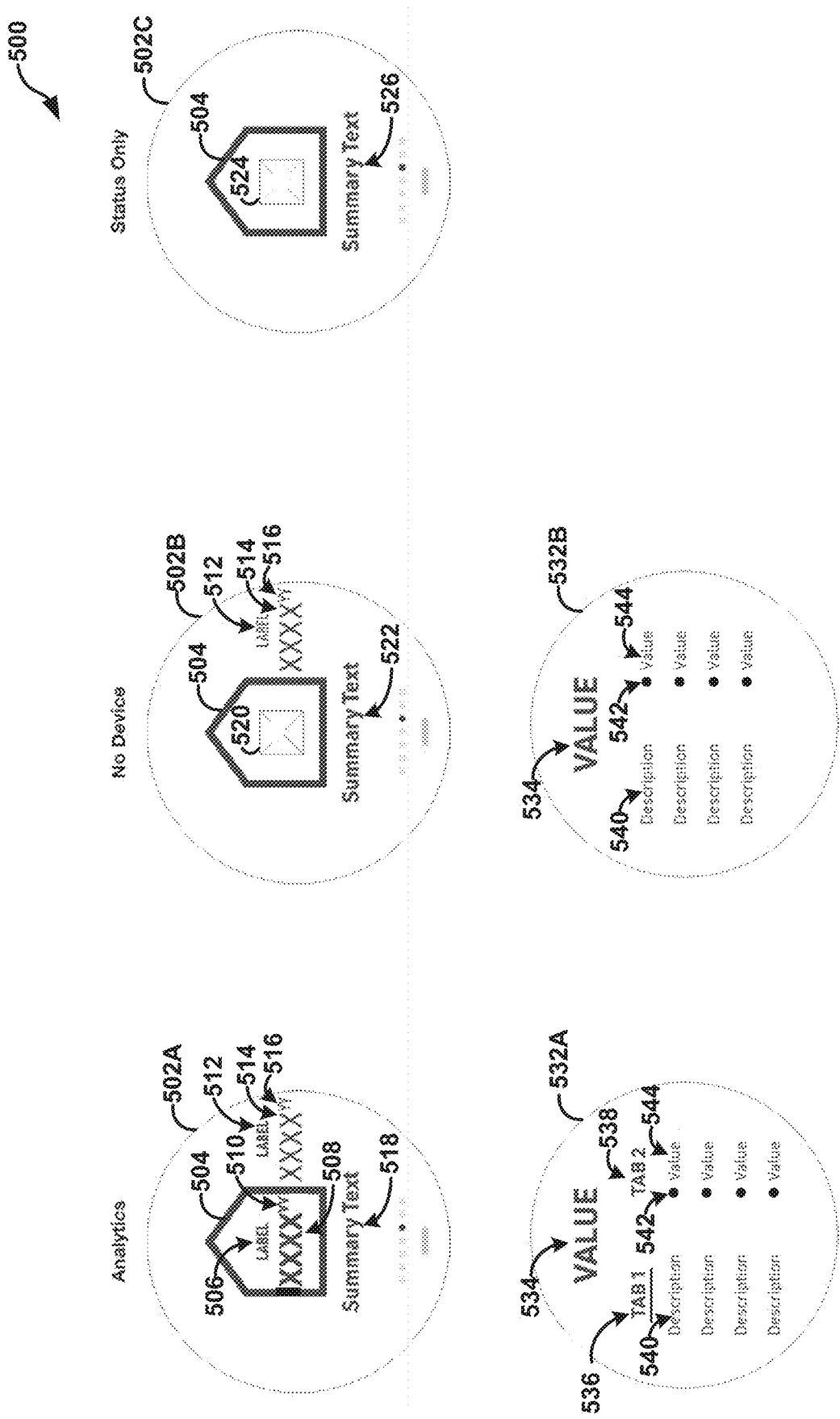
FIG. 5 is a conceptual diagram illustrating a set of screen templates which may be populated to generate screens displayed by a touch screen display, in accordance with one or more techniques described herein.

FIG. 5 is a conceptual diagram illustrating a set of screen templates 500 which may be populated to generate screens displayed by touch screen display 34, in accordance with one or more techniques described herein. As seen in FIG. 5, the set of screen templates 500 includes a set of carousel screen templates 502A-502C (collectively, "carousel screen templates 502") and a set of details screen templates 532A-532B (collectively, "details screen templates 532"). FIG. 5 is described with respect to building control system 10, HVAC controller 30, and external server 54 of FIGS. 1-3. However, the techniques of FIG. 5 may be performed by different components of building control system 10, HVAC controller 30, external server 54 or by additional or alternative systems or devices. In some examples, carousel screen templates 502 are an example of carousel screen templates 86 of FIG. 3. In some examples, details screen templates 532 are an example of details screen templates 88 of FIG. 3.

In some examples, external server 54 may generate one or more carousel screens based on carousel screen templates 502. Carousel screen templates 502 include an integrated device carousel screen template 502A, a non-integrated device carousel screen template 502B, and a device status only carousel screen template 502C. In some examples, to generate a carousel screen, external server 54 may select one of carousel screen templates 502 and populate the selected carousel screen template with information. Subsequently, external server 54 may output the carousel screen to HVAC controller 30 for display by touch screen display 34.

Integrated device carousel screen template 502A may represent a carousel screen template which includes one or more areas for information corresponding to integrated devices (e.g., the first set of devices 76 of FIG. 3) and one or more areas for information corresponding to non-integrated devices (e.g., the second set of devices 78 of FIG. 3). Integrated device carousel screen template 502A includes an icon 504, a first description space 506 for a first parameter value space 508, and a first unit space 510. As seen in FIG. 5, the first description space 506, the first parameter value space 508, and the first unit space 510 may be displayed within the icon 504. In some examples, external server 54 may receive a first parameter value measured by one of the integrated first set of devices 76 and populate the first parameter value space 508 with the first parameter value. Additionally, external server 54 may populate the first unit space 510 with a unit of the first parameter value. Due to the first parameter value being measured by an integrated device, external server 54 may populate the first parameter value space 508 with the first parameter value so that the first parameter value is displayed within the house icon 504. The first description space 506 may be populated with information which describes a parameter value that is populated in the first parameter value space 508.

Additionally, integrated device carousel screen template 502A includes a second description space 512, a second parameter value space 514, and a second unit space 516. As seen in FIG. 5, the second description space 512, the second parameter value space 514, and the second unit space 516 may be displayed outside of icon 504. In some examples, external server 54 may receive a second parameter value measured by one of the non-integrated second set of devices 78 and populate the second parameter value space 514 with the second parameter value. Additionally, external server 54 may populate the second unit space 516 with a unit of the second parameter value. Due to the second parameter value being measured by a non-integrated device, external server 54 may populate the second parameter value space 514 with the second parameter value so that the second parameter value is displayed outside of the house icon 504. The second description space 512 may be populated with information which describes a parameter value that is populated in the second parameter value space 514. Integrated device carousel screen template 502A includes a third description space 518 which may be populated with a description of a status of the parameter value populated in the first parameter value space 508 and/or a description of a status of the parameter value populated in the second parameter value space 514.

As described herein, a "parameter value" may refer to a numerical value or a descriptive status. For example, "82 degrees Fahrenheit" may represent a parameter value indicative of a temperature value, and the word "windy" or a wind icon may represent a parameter indicative of a weather status. Parameter value spaces described herein may be populated with any one or both of numerical values and descriptive statuses.

Non-integrated device carousel screen template 502B may include at least some of the elements that are included by integrated device carousel screen template 502A, except that non-integrated device carousel screen template 502B does not include space for displaying a parameter value measured by an integrated device (e.g., one of the first set of devices 76 of FIG. 2). For example, non-integrated device carousel screen template 502B includes the second description space 512, the second parameter value space 514, and the second unit space 516, but non-integrated device carousel screen template 502B does not include space for displaying a parameter value within icon 504. Rather, non-integrated device carousel screen template 502B includes an indicator space 520. In some examples, external server 54 may populate the indicator space 520 with an indicator which identifies one or more missing integrated devices. Description space 522 may, in some cases, be populated with information relating to other information populated on non-integrated device carousel screen template 502B Device status only carousel screen template 502C may include at least some of the elements that are included by integrated device carousel screen template 502A and at least some of the elements that are included by non-integrated device carousel screen template 502B. Device status only carousel screen template 502C may represent a template for a carousel screen which indicates a status of an integrated device. For example, the first set of devices 76 includes security device 50, which is integrated with HVAC controller 30. Icon 524 and description space 526 may be populated with information which indicates the status of the integrated device.

Integrated device details screen template 532A corresponds to integrated device carousel screen template 502A. In some examples, when external server 54 populates integrated device carousel screen template 502A in order to generate a carousel screen, external server 54 also populates integrated device details screen template 532A in order to generate a corresponding details screen, but this is not required. In some examples, external server 54 may generate a carousel screen without generating a corresponding details screen. Integrated device details screen template 532A includes a main value space 534 a first details tab 536 and a second details. Each details tab may include a first details column and a second details column. In the example of FIG. 5, the first details tab 536 is selected, meaning that the a details column 540 and a second details column 544 are shown. Color indicators 542 may indicate other information in addition to the first details column 540 and the second details column 544. When second details tab 538 is selected, other details columns may be shown.

Non-integrated device details screen template 532B corresponds to non-integrated device carousel screen template 502B. In some examples, non-integrated device details screen template 532B is substantially the same as integrated device details screen template 532A except that non-integrated device details screen template 532B does not include more than one tab for information to be displayed. In some examples, when external server 54 populates non-integrated device carousel screen template 502B in order to generate a carousel screen, external server 54 also populates non-integrated device details screen template 532B in order to generate a corresponding details screen, but this is not required. In some examples, external server 54 may generate a carousel screen without generating a corresponding details screen.

Figure 6:
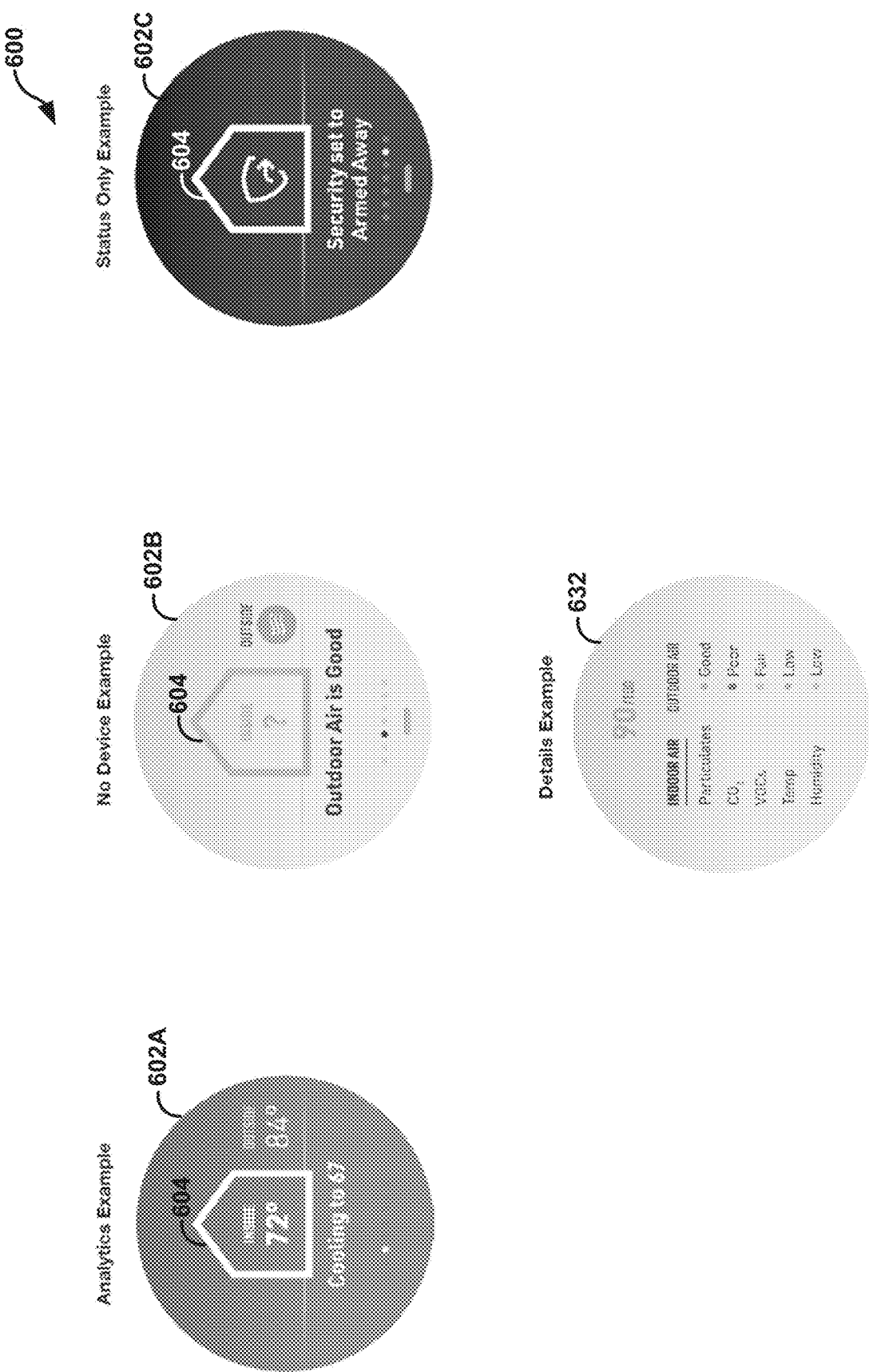
FIG. 6 is a conceptual diagram illustrating a set of screens which may be displayed by a touch screen display, in accordance with one or more techniques described herein.

FIG. 6 is a conceptual diagram illustrating a set of screens 600 which may be displayed by touch screen display 34, in accordance with one or more techniques described herein. As seen in FIG. 6, the set of screens 600 includes a set of example carousel screens 602A-602C (collectively, "carousel screens 602") and an example details screen 632. FIG. 6 is described with respect to building control system 10, HVAC controller 30, and external server 54 of FIGS. 1-3. However, the techniques of FIG. 6 may be performed by different components of building control system 10, HVAC controller 30, external server 54 or by additional or alternative systems or devices.

Carousel screen 602A may represent a carousel screen resulting from a population of integrated device carousel screen template 502A with information. For example, external server 54 may receive data which indicates a set of information. The external server 54 may select integrated device carousel screen template 502A based on the set of information. For example, the set of information may include both of an indoor temperature value measured by one or more of the first set of devices 76 and an outdoor temperature value measured by one or more of the second set of devices 78. Since the set of information includes information from both of the first set of devices 76 and the second set of devices 78, external server 54 may select carousel screen template 502A for population in order to generate carousel screen 602A.

External server 54 may populate the first parameter value space 508 with the indoor temperature value and populate the first unit space 510 with the unit of the indoor temperature value. Additionally, external server 54 may populate first description space 506 with an indication that the temperature value within the icon 604 is an indoor temperature. As seen in carousel screen 602A, the area within icon 604 includes the term "INSIDE" which represents information populated in the first description space 506 of the integrated device carousel screen template 502A and the area within icon 604 includes the term "72°" which represents the first parameter value (72) populated in the first parameter value space 508 and the unit (°) populated in the first unit space 510. External server 54 may populate the second parameter value space 514 with the outdoor temperature value and populate the second unit space 516 with the unit of the outdoor temperature value.

Additionally, external server 54 may populate second description space 512 with an indication that the temperature value located outside of the icon 604 is an outdoor temperature. As seen in carousel screen 602A, the area outside of icon 604 includes the term "OUTSIDE" which represents information populated in the second description space 512 of the integrated device carousel screen template 502A and the area outside of icon 604 includes the term "84°" which represents the second parameter value (84) populated in the second parameter value space 514 and the unit (°) populated in the second unit space 516. In the example of FIG. 6, external server 54 populates the third description space 518 with information indicating an action which HVAC controller 30 performs to control an environment within building 12. For example, carousel screen 602A includes the text "Cooling to 67." This indicates that HVAC controller 30 is controlling HVAC component(s) 16 to decrease the inside temperature to a cooling set point of 67 degrees. As such, external server 54 is configured to select integrated device carousel screen template 502A and populate this template in order to display a comparison between an inside parameter value and a corresponding outdoor parameter value.

Carousel screen 602B may represent a carousel screen resulting from a population of non-integrated device carousel screen template 602B with information. For example, external server 54 may receive data which indicates a set of information. The external server 54 may select non-integrated device carousel screen template 502B based on the set of information. For example, the set of information may include an outdoor air quality received from one or more of the second set of devices 78 and not include an indoor air quality. Since the set of information includes air quality information from the non-integrated second set of devices 78 and does not include air quality information from the integrated first set of devices 76, external server 54 may select non-integrated device carousel screen template 502B for population in order to generate carousel screen 602B.

External server 54 may populate non-integrated device carousel screen template 502B in order to indicate that an outside air quality is known, and an inside air quality is unknown. For example, as seen in carousel screen 602B, the "Inside ?" message on the inside of icon 604 indicates that an inside air quality of building 12 is unknown. In some examples, when touch screen display 34 displays carousel screen 602B, touch screen display 34 may receive a touch input to the area within icon 604 which includes the "Inside ?" message. Subsequently, touch screen display 34 may display a screen which includes one or more instructions for how to integrate an air quality sensor with HVAC controller 30. For example, the instructions may include instructions for how to integrate air quality sensor 48 with HVAC controller 30. In some examples, responsive to integrating air quality sensor 48 with HVAC controller 30, external server 54 may receive another set of information which includes both of an inside air quality from air quality sensor 48 and an outside air quality from external database(s) 52. Subsequently, external server 54 may generate another air quality carousel screen by populating integrated device carousel screen 602A with both of the inside air quality and the outside air quality.

Carousel screen 602C may represent a carousel screen resulting from a population of status only carousel screen template 502C with information. For example, external server 54 may populate carousel screen template 502C with information corresponding to a status of an integrated device, such as security device 50. As seen in carousel screen 602C, carousel screen template 502C is populated with information indicating that the "Security set to Armed Away." Since "Armed Away" relates to the status of security device 50 and not a status of an environment within or outside of building 12, external server 54 may select carousel screen template 502C for population with information in order to generate carousel screen 602C. Details screen 632 may represent an air quality details screen resulting from a population of Carousel screen 632A.

Figure 7:
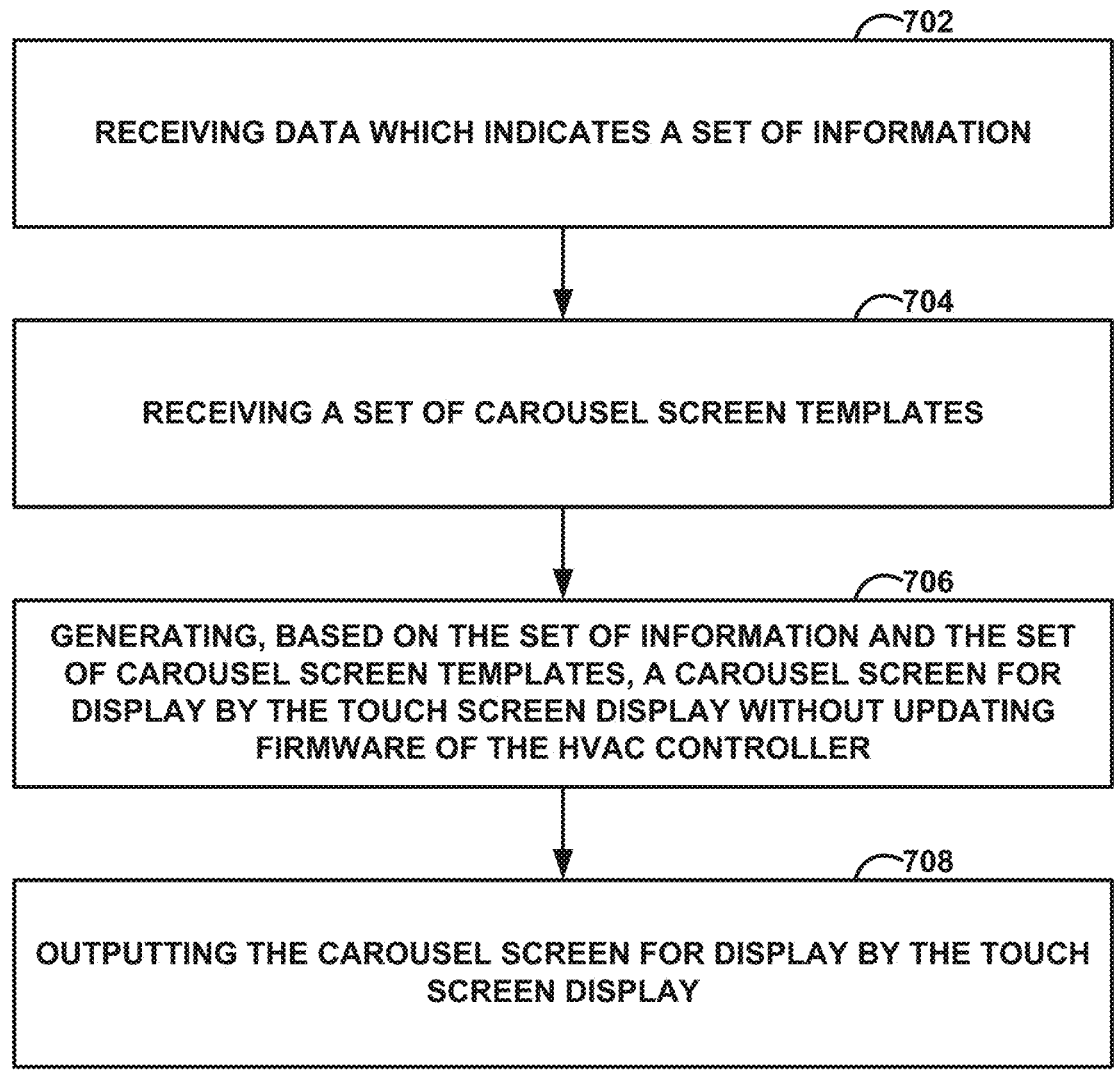
FIG. 7 is a flow diagram illustrating an example operation for generating a carousel screen for display by a touch screen display 34 in accordance with one or more techniques described herein.

FIG. 7 is a flow diagram illustrating an example operation for generating a carousel screen for display by touch screen display 34, in accordance with one or more techniques described herein. FIG. 7 is described with respect to building control system 10, HVAC controller 30, and external server 54 of FIGS. 1-3. However, the techniques of FIG. 4 may be performed by different components of building control system 10, HVAC controller 30, and external server 54, or by additional or alternative devices.

External server 54 receives data which indicates a set of information (702). In some examples, the set of information includes information from one or both of the first set of devices 76 and the second set of devices 78. Additionally, external server 54 is configured to receive a set of carousel screen templates 86 (704). In some examples, external server 54 stores the set of carousel screen templates 86 in memory 84. External server 54 may select, based on the set of information, a carousel screen template from the set of carousel screen templates 86 to serve as a template for a carousel screen. For example, external server 54 may select the carousel screen based on whether the set of information includes information from one or more integrated devices and whether the set of information includes information from one or more non-integrated devices.

External server 54 may generate, based on the set of information and the set of carousel screen templates 86, a carousel screen for display by touch screen display 34 without updating a firmware of the HVAC controller 30 (706). For example, each carousel screen template of the set of carousel screen templates 86 may be compatible with the firmware of HVAC controller 30. As such, a screen which is generated by populating one of the carousel screen templates may be compatible with the firmware of HVAC controller 30. External server 54 may output the carousel screen for display by touch screen display 34 (708).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Various examples have been described. These and other examples are within the scope of the following claims.

What is claimed is:

1. A system for controlling a set of heating, ventilation, and air conditioning (HVAC) components in order to regulate one or more parameters of a building, wherein the system comprises:
   an HVAC controller device comprising:
      a dial; and
      a touch screen display; and
   an external server configured to communicate with the HVAC controller via a communication link, wherein the external server is configured to:
      receive data which indicates a set of information from one or more devices including the HVAC controller device, one or more external databases, one or more other devices, or any combination thereof;
      generate, based on the set of information and a set of screen templates stored in a memory of the external server, a screen for display by the touch screen display without updating firmware of the HVAC controller device, wherein the screen comprises a respective screen template of the set of screen templates which is populated with at least a portion of the set of information; and
      output, to the HVAC controller device, the screen for display by the touch screen display.

2. The system of claim 1, wherein to generate the screen, the external server is configured to:
   identify a controller type of the HVAC controller device configured to communicate with the external server via the communication link;
   select, based on the set of information and the controller type of the HVAC controller device, the screen template from the set of screen templates to serve as a template for the screen; and
   populate the selected screen template with the at least the portion of the set of information in order to generate the screen.

3. The system of claim 2, wherein the set of screen templates is a set of first level screen templates, wherein the screen is a first level screen, and wherein the external server is configured to:
   generate, based on the set of information and a set of second level screen templates stored in the memory of the external server, a second level screen corresponding to the first level screen for display by the touch screen display without updating firmware of the HVAC controller device, wherein the second level screen corresponds to a respective second level screen template of the set of second level screen templates which is populated with at least a portion of the set of information; and
   output the second level screen for display by the touch screen display,
   wherein the HVAC controller device is configured to display the second level screen on the touch screen display responsive to receiving a user input to the touch screen display while the touch screen display is displaying the first level screen, and
   wherein the second level screen includes at least some information in addition to information included on the first level screen.

4. The system of claim 2, wherein the external server is configured to receive the data which indicates the set of information from the one or more devices including the HVAC controller device, one or more external databases, one or more other devices, or any combination thereof,
   wherein the one or more devices include a first set of devices and a second set of devices,
   wherein the first set of devices includes the HVAC controller device and one or more other devices integrated with the HVAC controller in order to control the set of HVAC components to regulate the one or more parameters of the building,
   wherein the first set of devices provide information corresponding to the building which is regulated by the HVAC controller device, and
   wherein the second set of devices includes the one or more external databases which provide information corresponding to an environment outside of the building which is regulated by the HVAC controller device.

5. The system of claim 4, wherein the external server is further configured to:
   determine whether the data which indicates the set of information includes data received from at least one device of the first group of devices; and
   responsive to determining that the data which indicates the set of information includes data received from at least one device of the first group of devices, determine whether the set of information includes information corresponding to the one or more parameters regulated by the HVAC controller device.

6. The system of claim 5, wherein to select the screen template from the set of screen templates, the external server is configured to:
   select a first screen template from the set of screen templates responsive to determining that the data which indicates the set of information includes data received from at least one device of the first group of devices and responsive to determining that the set of information includes information corresponding to the one or more parameters regulated by the HVAC controller device,
   wherein the first screen template includes a section for displaying information corresponding to the one or more parameters regulated by the HVAC controller device;
   select a second screen template from the set of screen templates responsive to determining that the data which indicates the set of information does not include data received from the first group of devices,
   wherein the second screen template includes a section for displaying information corresponding to the environment outside of the building which is regulated by the HVAC controller device; and
   select a third screen template from the set of screen templates responsive to determining that the data which indicates the set of information includes data received from at least one device of the first group of devices and responsive to determining that the set of information does not include information corresponding to the one or more parameters regulated by the HVAC controller device,
wherein the third screen template includes a section for displaying a status of one or more devices of the first set of devices.

7. The system of claim 1, wherein the data represents first data, wherein the set of information represents a second set of information, wherein the screen represents a first screen, and wherein the external server is further configured to:
receive second data which indicates a second set of information;
generate, based on the second set of information and the set of screen templates, a second screen for display by the touch screen display without updating firmware of the HVAC controller device, wherein the second screen comprises a respective screen template of the set of screen templates which is populated with at least a portion of the second set of information; and
output the second screen for display by the touch screen display.

8. The system of claim 1, wherein the HVAC controller device is configured to:
change, based on a rotation of the dial, a set point temperature for an area within the building form a first set point temperature to a second set point temperature; and
control one or more of the set of HVAC components in order to cause a temperature of the area within the building to reach the second set point temperature.

9. The system of claim 1, wherein the screen represents one of a sequence of screens for display by the touch screen display, and wherein the HVAC controller device is configured to scroll, in response to detecting a set of user inputs to one or both of the touch screen input and the dial, through the sequence of screens for display on the touch screen display.

10. The system of claim 9, wherein the external server is configured to:
select a screen of the set of screens to represent a default screen;
cause the HVAC controller device to display the default screen on the touch screen display when a period of time elapses since a most recent user input is received by the HVAC controller device.

11. The system of claim 9, wherein the HVAC controller device is further configured to:
detect a user input which represents a selection of a menu button of a carousel screen of the sequence of carousel screens which is currently displayed by the touch screen display; and
transition, in response to detecting the user input, from displaying the carousel screen of the sequence of carousel screens on the digital user interface to displaying a details screen which corresponds to the carousel screen of the sequence of carousel screens.

12. A method for controlling a set of heating, ventilation, and air conditioning (HVAC) components in order to regulate one or more parameters of a building, wherein the method comprises:
receiving, by an external server configured to communicate with an HVAC controller device via a communication link, data which indicates a set of information from one or more devices including the HVAC controller device, one or more external databases, one or more other devices, or any combination thereof,
wherein the HVAC controller device comprises a dial and a touch screen display;
generating, by the external server based on the set of information and a set of screen templates stored in a memory of the external server, a screen for display by the touch screen display without updating firmware of the HVAC controller device, wherein the screen comprises a respective screen template of the set of screen templates which is populated with at least a portion of the set of information; and
outputting, by the external server to the HVAC controller device, the screen for display by the touch screen display.

13. The method of claim 12, wherein generating the screen comprises:
identifying, by the external server, a controller type of the HVAC controller device configured to communicate with the external server via the communication link;
selecting, by the external server based on the set of information and the controller type of the HVAC controller device, the screen template from the set of screen templates to serve as a template for the screen; and
populating, by the external server, the selected screen template with the at least the portion of the set of information in order to generate the screen.

14. The method of claim 13, wherein the set of screen templates is a set of first level screen templates, wherein the screen is a first level screen, and wherein the method further comprises:
generating, by the external server based on the set of information and a set of second level screen templates stored in the memory of the external server, a second level screen corresponding to the first level screen for display by the touch screen display without updating firmware of the HVAC controller device, wherein the second level screen corresponds to a respective second level screen template of the set of second level screen templates which is populated with at least a portion of the set of information;
outputting, by the external server, the second level screen for display by the touch screen display; and
displaying, by the HVAC controller device, the second level screen on the touch screen display responsive to receiving a user input to the touch screen display while the touch screen display is displaying the first level screen,
wherein the second level screen includes at least some information in addition to information included on the first level screen.

15. The method of claim 13, further comprising:
receiving, by the external device, the data which indicates the set of information from the one or more devices including the HVAC controller device, one or more external databases, one or more other devices, or any combination thereof,
wherein the one or more devices include a first set of devices and a second set of devices,
wherein the first set of devices includes the HVAC controller device and one or more other devices integrated with the HVAC controller in order to control the set of HVAC components to regulate the one or more parameters of the building,
wherein the first set of devices provide information corresponding to the building which is regulated by the HVAC controller device, and wherein the second set of devices includes the one or more external databases which provide information corresponding to an environment outside of the building which is regulated by the HVAC controller device.

16. The method of claim 15, further comprising:

determining, by the external server, whether the data which indicates the set of information includes data received from at least one device of the first group of devices; and responsive to determining that the data which indicates the set of information includes data received from at least one device of the first group of devices, determining, by the external server, whether the set of information includes information corresponding to the one or more parameters regulated by the HVAC controller device.

17. The method of claim 16, wherein selecting the screen template from the set of screen templates comprises selecting a first screen template from the set of screen templates responsive to determining that the data which indicates the set of information includes data received from at least one device of the first group of devices and responsive to determining that the set of information includes information corresponding to the one or more parameters regulated by the HVAC controller device, wherein the first screen template includes a section for displaying information corresponding to the one or more parameters regulated by the HVAC controller device;

selecting a second screen template from the set of screen templates responsive to determining that the data which indicates the set of information does not include data received from the first group of devices, wherein the second screen template includes a section for displaying information corresponding to the environment outside of the building which is regulated by the HVAC controller device; and selecting a third screen template from the set of screen templates responsive to determining that the data which indicates the set of information includes data received from at least one device of the first group of devices and responsive to determining that the set of information does not include information corresponding to the one or more parameters regulated by the HVAC controller device, wherein the third screen template includes a section for displaying a status of one or more devices of the first set of devices.

18. The method of claim 12, wherein the data represents first data, wherein the set of information represents a second set of information, wherein the screen represents a first screen, and wherein the method further comprises:

receiving, by the external server, second data which indicates a second set of information;

generating, by the external server based on the second set of information and the set of screen templates, a second screen for display by the touch screen display without updating firmware of the HVAC controller device, wherein the second screen comprises a respective screen template of the set of screen templates which is populated with at least a portion of the second set of information; and outputting, by the external server, the second screen for display by the touch screen display.

19. The method of claim 12, further comprising:

changing, by the HVAC controller device based on a rotation of the dial, a set point temperature for an area within the building form a first set point temperature to a second set point temperature; and controlling, by the HVAC controller device, one or more of the set of HVAC components in order to cause a temperature of the area within the building to reach the second set point temperature.

20. A heating, ventilation, and air conditioning (HVAC) controller device comprising:

a dial;

a touch screen display; and processing circuitry configured to:

receive, from an external server configured to communicate with the HVAC controller via a communication link, a screen for display by the touch screen display, wherein the external server is configured to:

receive data which indicates a set of information from one or more devices including the HVAC controller device, one or more external databases, one or more other devices, or any combination thereof;

generate, based on the set of information and a set of screen templates stored in a memory of the external server, the screen for display by the touch screen display without updating firmware of the HVAC controller device, wherein the screen comprises a respective screen template of the set of screen templates which is populated with at least a portion of the set of information.

* * * * *